(12) United States Patent
Muirhead

(10) Patent No.: US 12,503,895 B2
(45) Date of Patent: Dec. 23, 2025

(54) FOLDING TONNEAU COVER

(71) Applicant: Scott Arthur William Muirhead, Langley (CA)

(72) Inventor: Scott Arthur William Muirhead, Langley (CA)

(*) Notice: Subject to any disclaimer, the term of this patent is extended or adjusted under 35 U.S.C. 154(b) by 257 days.

(21) Appl. No.: 18/124,531

(22) Filed: Mar. 21, 2023

(65) Prior Publication Data

US 2024/0318480 A1  Sep. 26, 2024

Related U.S. Application Data

(60) Provisional application No. 63/322,189, filed on Mar. 21, 2022.

(51) Int. Cl.
  *E05D 1/02*  (2006.01)
  *B60J 7/14*  (2006.01)

(52) U.S. Cl.
  CPC .............. *E05D 1/02* (2013.01); *B60J 7/141* (2013.01); *E05Y 2900/548* (2013.01)

(58) Field of Classification Search
  CPC .............................................. E05Y 2900/548
  USPC ............. 296/100.06, 100.08, 100.09; 16/225
  See application file for complete search history.

(56) References Cited

U.S. PATENT DOCUMENTS

| | | |
|---|---|---|
| 2,268,669 A | 1/1942 | Moore |
| 3,662,807 A | 5/1972 | Miller |
| 4,221,423 A | 9/1980 | Stone |
| 4,273,377 A | 6/1981 | Alexander |
| 4,313,636 A | 2/1982 | Deeds |
| 4,409,758 A | 10/1983 | Dickson et al. |
| 4,418,954 A | 12/1983 | Buckley |
| 4,518,194 A | 5/1985 | Kirkam et al. |
| 4,747,441 A | 5/1988 | Apolzer et al. |
| 4,807,921 A | 2/1989 | Champie, III et al. |

(Continued)

FOREIGN PATENT DOCUMENTS

| DE | 10207157 A1 * | 8/2003 | ............... A47K 3/30 |
|---|---|---|---|
| KR | 20210012535 A * | 2/2021 | ............... B60J 7/12 |

OTHER PUBLICATIONS

Translation of KR 20210012535 (Year: 2021).*

*Primary Examiner* — Amy R Weisberg
*Assistant Examiner* — Veronica M Condo
(74) *Attorney, Agent, or Firm* — Fish & Richardson P.C.

(57) ABSTRACT

A hard folding tonneau cover for a pickup truck bed is described. The cover assembly is affixed directly to the truck bed instead of prior art mounting frames attached to the sides of the truck bed. Each cover assembly includes a fixed bulk head panel and at least three foldable cover panels, connected to the bulk head panel, to enclose the open truck bed. A rubber hinge connector is provided between each panel to allow the panels to rotate up to 180 degree into a folded-open configuration. The panels are supported over the truck bed in a flush position by laterally projecting side frame elements. The cover panel adjacent the truck bed tail gate includes a locking latch assembly mounted exteriorly on the top surface and the bottom surface. Slam latching mechanisms mounted on the bottom cover panel surfaces secure the closed cover panels against the inside edge of the truck bed. The cover panels can be released without dropping the tailgate. The bulk head panel supports the stack of folded cover panels in a vertical position.

8 Claims, 27 Drawing Sheets

(56) References Cited

U.S. PATENT DOCUMENTS

| | | | |
|---|---|---|---|
| 4,830,080 A | 5/1989 | Densen | |
| 4,844,531 A | 7/1989 | Kooiker | |
| 4,946,217 A | 8/1990 | Steffens et al. | |
| 5,148,850 A * | 9/1992 | Urbanick | E06B 3/486 16/225 |
| 5,427,428 A | 6/1995 | Ericson et al. | |
| 5,502,930 A * | 4/1996 | Burkette | G09F 15/0068 52/282.1 |
| 5,595,417 A | 1/1997 | Thoman et al. | |
| 5,636,893 A | 6/1997 | Wheatley et al. | |
| 5,653,491 A | 8/1997 | Steffens et al. | |
| 5,823,605 A | 10/1998 | Seargeant | |
| 5,931,521 A | 8/1999 | Kooiker | |
| 6,024,402 A | 2/2000 | Wheatley | |
| 6,095,588 A | 8/2000 | Rodosta | |
| 6,176,541 B1 | 1/2001 | Hoff | |
| 6,302,468 B1 | 10/2001 | Steadman | |
| 6,352,296 B1 | 3/2002 | Kooiker | |
| 6,422,635 B1 | 7/2002 | Steffens et al. | |
| 6,767,051 B2 | 7/2004 | Erlandsson et al. | |
| 6,899,372 B1 | 5/2005 | Keller | |
| 7,021,693 B2 | 4/2006 | Keller | |
| 7,252,322 B2 | 8/2007 | Rusu | |
| 7,334,830 B2 | 2/2008 | Weldy | |
| 7,484,788 B2 | 2/2009 | Calder et al. | |
| 7,537,264 B2 | 5/2009 | Maimin et al. | |
| 8,061,758 B2 | 11/2011 | Maimin et al. | |
| 8,128,149 B1 | 3/2012 | Wolf et al. | |
| 8,182,021 B2 | 5/2012 | Maimin et al. | |
| 8,262,148 B2 | 9/2012 | Rusher et al. | |
| 8,366,173 B2 | 2/2013 | Xu | |
| 8,690,224 B2 | 4/2014 | Maimin et al. | |
| 8,960,224 B2 | 2/2015 | Case et al. | |
| 9,067,481 B2 | 6/2015 | Xu | |
| 9,211,834 B2 | 12/2015 | Facchinello et al. | |
| 9,482,039 B1 | 11/2016 | Xu | |
| 9,487,070 B2 | 11/2016 | Xu | |
| 9,555,735 B2 * | 1/2017 | Kerr, III | B60P 7/02 |
| 9,623,737 B2 | 4/2017 | Facchinello et al. | |
| 9,815,358 B1 * | 11/2017 | Quintus | B60J 7/141 |
| 10,046,632 B2 | 8/2018 | Dylewski, II et al. | |
| 10,112,466 B2 | 10/2018 | Facchinello | |
| 10,245,928 B1 | 4/2019 | Facchinello | |
| 10,322,624 B2 | 6/2019 | Facchinello et al. | |
| 10,328,780 B2 | 6/2019 | Delong | |
| 10,337,221 B2 | 7/2019 | Jeffries et al. | |
| 10,464,401 B2 | 11/2019 | Facchinello et al. | |
| 10,471,815 B2 | 11/2019 | Carter et al. | |
| 10,525,803 B2 | 1/2020 | Hutchens, III et al. | |
| 10,717,350 B2 | 7/2020 | Dylewski, II et al. | |
| 10,730,375 B2 * | 8/2020 | Ma | B60P 7/02 |
| 10,960,745 B2 | 3/2021 | Dylewski, II et al. | |
| 11,034,223 B2 | 6/2021 | Hutchens, III et al. | |
| 11,148,512 B2 | 10/2021 | Shi et al. | |
| 11,180,010 B1 | 11/2021 | Xu | |
| 11,186,150 B2 | 11/2021 | Cao | |
| 11,186,151 B1 | 11/2021 | Xu | |
| 11,235,649 B1 | 2/2022 | Lin et al. | |
| 11,279,212 B2 | 3/2022 | Wang | |
| 2012/0205939 A1 * | 8/2012 | Maimin | B60J 7/141 296/100.07 |
| 2016/0200376 A1 | 7/2016 | Kerr | |
| 2016/0340949 A1 | 11/2016 | Xu | |
| 2020/0376941 A1 | 12/2020 | Cai et al. | |
| 2021/0016646 A1 | 1/2021 | Dylewski, II | |
| 2021/0053427 A1 | 2/2021 | Gu et al. | |
| 2021/0061078 A1 * | 3/2021 | Cai | B60J 7/198 |
| 2021/0061079 A1 | 3/2021 | Sun et al. | |
| 2021/0170849 A1 * | 6/2021 | Dylewski, II | B60J 7/198 |
| 2021/0221204 A1 | 7/2021 | Hui | |
| 2021/0291633 A1 | 9/2021 | Gu et al. | |
| 2021/0347237 A1 | 11/2021 | Mahler | |
| 2022/0055462 A1 | 2/2022 | Xu | |

* cited by examiner

FOLDING TONNEAU COVER

FIELD

The present disclosure generally relates to truck bed covers, and, more particularly, to a folding cover that is deployed over an open truck bed.

BACKGROUND

Pickup trucks are provided with a truck bed for carrying cargo and the like. Oftentimes truck owners cover the open truck bed with a tonneau cover to conceal and or protect cargo contained therein, to prevent theft and exposure to the elements.

Hard folding covers are popular among truck owners because the cover panels can be folded open into a stacked configuration to expose an open space for carrying cargo extending above the truck bed. The panels can be folded open and closed on the fly, providing a great deal of versatility. There are two popular varieties of hard folding covers available on the market.

The first hard folding cover style mounts upon the top of the truck bed. This style of cover is supported in place by the truck bed itself. Such hard folding covers are described in U.S. Pat. No. 7,484,788 to Calder et al., entitled "SOLID FOLD Tonneau System". These hard folding covers include four corner latches affixed to the underside of the folding panels of the hard cover. The latches are hand positioned along the inside bottom ledge of the top of the truck bed, at the front and rear ends of the opposed truck bed sidewalls. Such covers are lightweight and easily removed without tools if an open truck bed is needed. This style is sometimes referred to a bi-fold cover. However, such bi-fold hard covers have a distracting or bulky side profile because they sit on top of the truck bed and they only open part way with a bi-fold action, limiting the ability of the truck owner to access the full bed. It would be advantageous to provide a hard folding cover that has a flush profile with the top of the truck bed. It would be a further advantage to provide a cover that folds all the way open to provide an uncovered truck bed.

The second hard folding cover style has a flush profile and mounts upon auxiliary side rail frames that are clamped to the opposed side walls of the truck bed. Such hard folding covers are recognized in U.S. Pat. No. 8,182,021 to Maimin et al., entitled "Pick-up Truck Box Cover", U.S. Pat. No. 9,815,358 to Quinyus et al., entitled "Foldable tonneau cover with an extruded forward section" and US Publication 2021/0016646 to Dylewski, entitled "Multi-panel Tonneau Cover".

The second styles of hard folding cover include side rail frames having a side wall that is engaged with the side walls of the truck bed by means of a plurality of clamps. Projecting from the side wall of the side wall frame below the top margin is a support surface to bear the lateral edges of the panels of the cover apparatus. The support surface is positioned vertically along the length of the side wall so that top surfaces of the panels of the cover are substantially flush with the top of the truck bed. The support surface of the side wall frames at the forward end, near the front wall bulk head, include an attachment plate. A bulk head panel of the three or four panel assembly is affixed to the attachment plate so that the folded panels can be rotated into a vertical position behind the cabin of the pickup truck over the bulk head panel, to provide an open truck bed.

However, such tri-fold and four fold folding covers are more expensive than solid folding covers because they utilize opposed bed rail frames and a plurality of clamps with each passenger and driver side rail frame. The side rail frames are typically longer than the width of the panels and require a second packaging box or a larger single box packaging. This adds further cost and complexity. The side rail frames also admit water into the closed truck bed and require sealing means including extra gaskets, extrusion seals and sometimes truck bed modifications for drain tubes. It would be advantageous to provide a hard folding cover with a flush profile that mounts directly to the truck bed without the use of auxiliary bed rail frames to provide a closed, semi-open or an open truck bed on the fly at lower cost and complexity.

These and other advantages are presented in the following written disclosure and corresponding figures.

SUMMARY OF THE INVENTION

A first inventive aspect is a hard folding cover apparatus that excludes auxiliary side mounting rails with clamp assemblies for supporting the panels in a substantially flush position within the top margin of the open truck bed. The first inventive aspect is facilitated by panels with lateral sides that extend over and rest upon the top margin of the open truck bed to suspend the panels below the top of the open truck bed. The panels are less than an inch thick and the top surface of each panel is positioned substantially flush with the top of the truck bed.

A second inventive aspect is a hard folding cover apparatus that attaches to the front corners of the open truck bed, rather than auxiliary side rail apparatus. The second inventive aspect is facilitated by a pair of no-drill mounting plates affixed to the side walls at the front two corners of the open truck bed. A forward bulk head panel is fastened to the mounting plates in a fixed position against the front bulk head wall of the truck bed. The rear ward panels connected to the forward bulk head panel fold open and closed toward the tailgate of the truck bed. The fixed position of the bulk head panel insures the folding cover panels rotate into open and closed positions between the truck bed side walls.

A third inventive aspect is a hard folding cover apparatus that includes spaced apart hinge bridges between the panels. Because the panels have a thickness the third inventive aspect is facilitated by rubber extrusions that include front and rear panel connections and bridging sections of variable width that join the side-by-side panels covering the open truck bed. A first rubber member between tailgate panel and the middle panel folds 180 degrees to permit the tailgate panel to sit parallel with middle panel in a first ⅓ semi-open position. A second rubber member between the middle panel and the forward panel is wider than the first rubber member because the second rubber member accommodates the thickness of the tail gate panel and middle panel when the middle panel is rotated 180 degrees to permit the tail gate and middle panels to sit parallel with the forward panel in a second ⅔s semi-open position. A third rubber member between the bulk head panel and the forward panel rotates +/−90 degrees, to fold the three stacked panels in a ⅔s semi-open horizontal position into a vertical position above the bulk head panel, where the three folded panels are positioned to provide essentially full access to the open truck bed.

A fourth inventive aspect is a hard folding cover apparatus which allows the pickup truck operator to open the tail gate panel without dropping the tail gate. A lockable latch on the top of the last tail gate panel is provided. A latch located entirely on the bottom of the tail gate panel requires the truck owner to drop the tail gate in order to access the unlatch mechanism. It may not be safe to lower the tail gate when the vehicle is hooked up to a trailer for towing. It may be impractical to lower the tailgate to access the cover release mechanism(s) if the truck is backed up to a wall or another vehicle in a parking lot. It is simply inconvenient to have to lower the tail gate to access the release mechanisms of the prior art. A tail gate cover panel that can be opened from the top and the bottom of the tail gate panel would be advantageous.

Further inventive aspects and improvements are shown in the Drawings and in the Description to follow. It should be understood that the drawings, description and embodiments are intended for purposes of illustration only and are not to be construed as limiting as to the scope of the present disclosure and claims.

DRAWINGS

DETAILED DESCRIPTION

With reference to truck beds, the following description is only illustrative and not limiting as to a type of truck bed of which there are many makes, models, sizes, materials and brands. A generic truck bed is shown or described for descriptive purposes.

Figure 1:
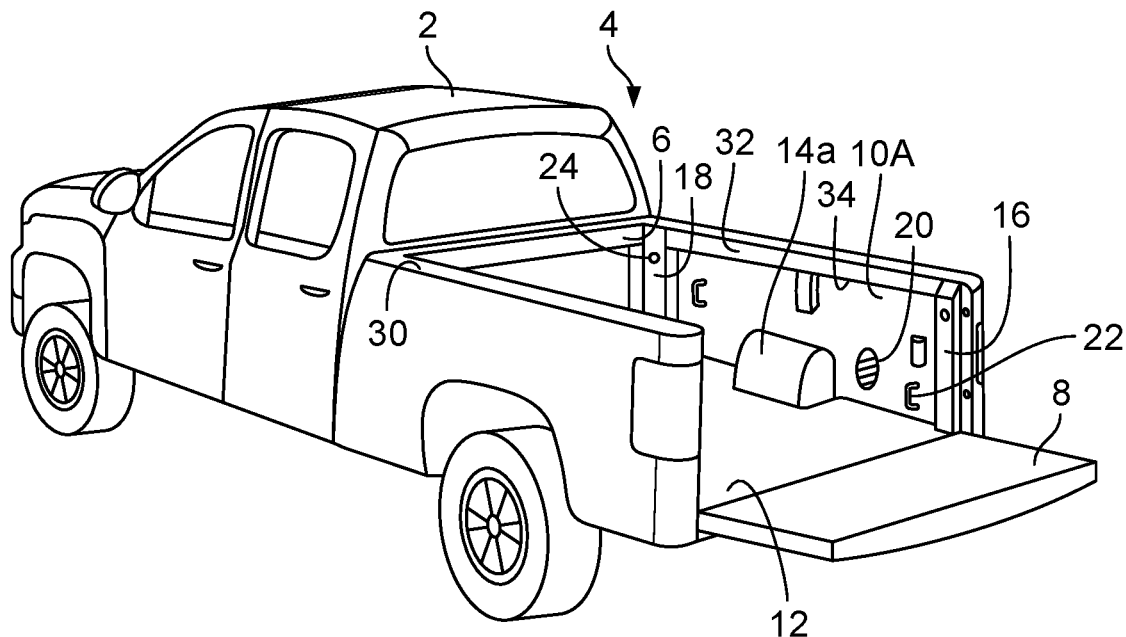
FIG. 1 shows the features of a pickup truck in perspective view.

Referring to FIG. 1, a pickup truck 2 is shown with an open truck bed 4. The truck bed has a forward bulk head 6, a rearward tail gate 8, opposed side walls 10a and 10b and a floor 12. The opposed side walls extend between the forward bulk head and the rearward tail gate and include opposed wheel wells 14a and 14b (not shown). The side walls also include a rear pillar 16 and a forward front pillar 18. Between the forward and rearward pillars of the side walls are accessories including lights 20, tie-down hooks 22, miscellaneous apertures 24 and utility side rails (not shown). The open truck bed is further defined by a top ledge 30 and an inside downturn lip 32 terminating in an inside edge 34.

Figure 2:
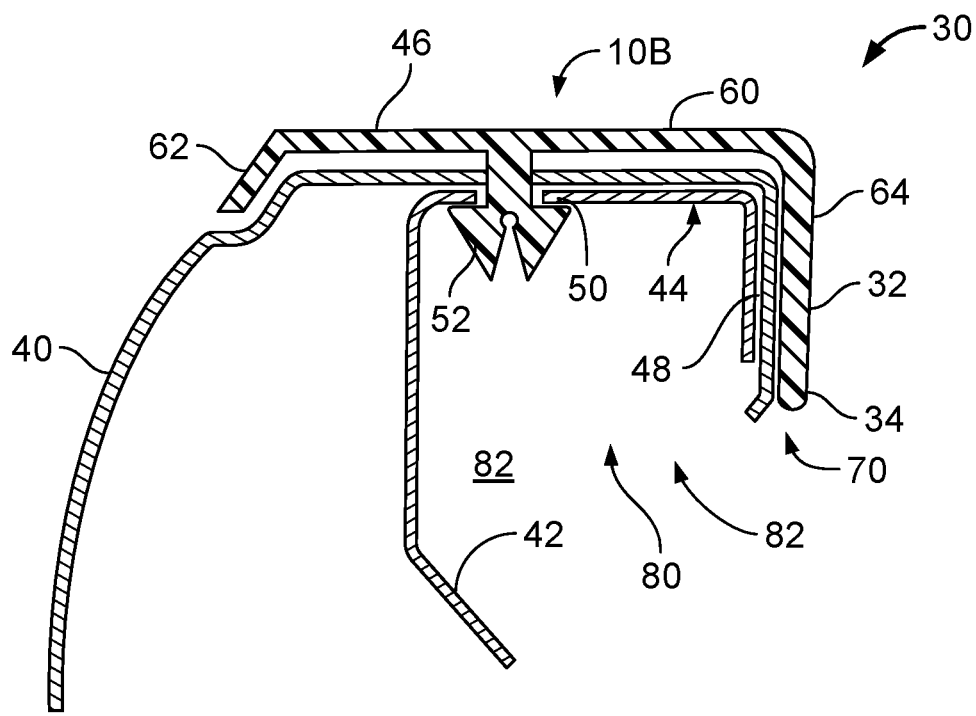
FIG. 2 is a cross section of the top portion of a truck bed side wall.

Referring to FIG. 2, a cross section of a top portion of the driver side wall 10b of the truck bed is illustrated for exemplary purposes. The top portion of the side wall comprises an outer truck bed wall 40 and an inner truck bed wall 42. The outer and inner walls are typically constructed out of a metal alloy, although some inner truck bed walls are constructed out of composite plastic materials. The outer and inner truck bed walls are joined proximate the top ledge of the truck bed to provide a reinforced structure 44 which includes a double walled down-turn lip 48. The top ledge surface in the present example is formed by a plastic bed rail cap 46, which is dent and scratch resistant. The plastic bed rail cap is attached to the reinforced structure by a press fit embossment 52 through aligned holes 50 between the outer and inner truck bed walls. The bed rail cap has an upper surface 60, an outside downward extending wall 62 and an inside downward extending wall 64. The inside wall of the bed rail cap and the double walled down-turn lip of the metal alloy bed form an edge 70. The inside margin underneath the top of the truck bed rail defines an open space 80 or undercut area 82.

Figure 3:
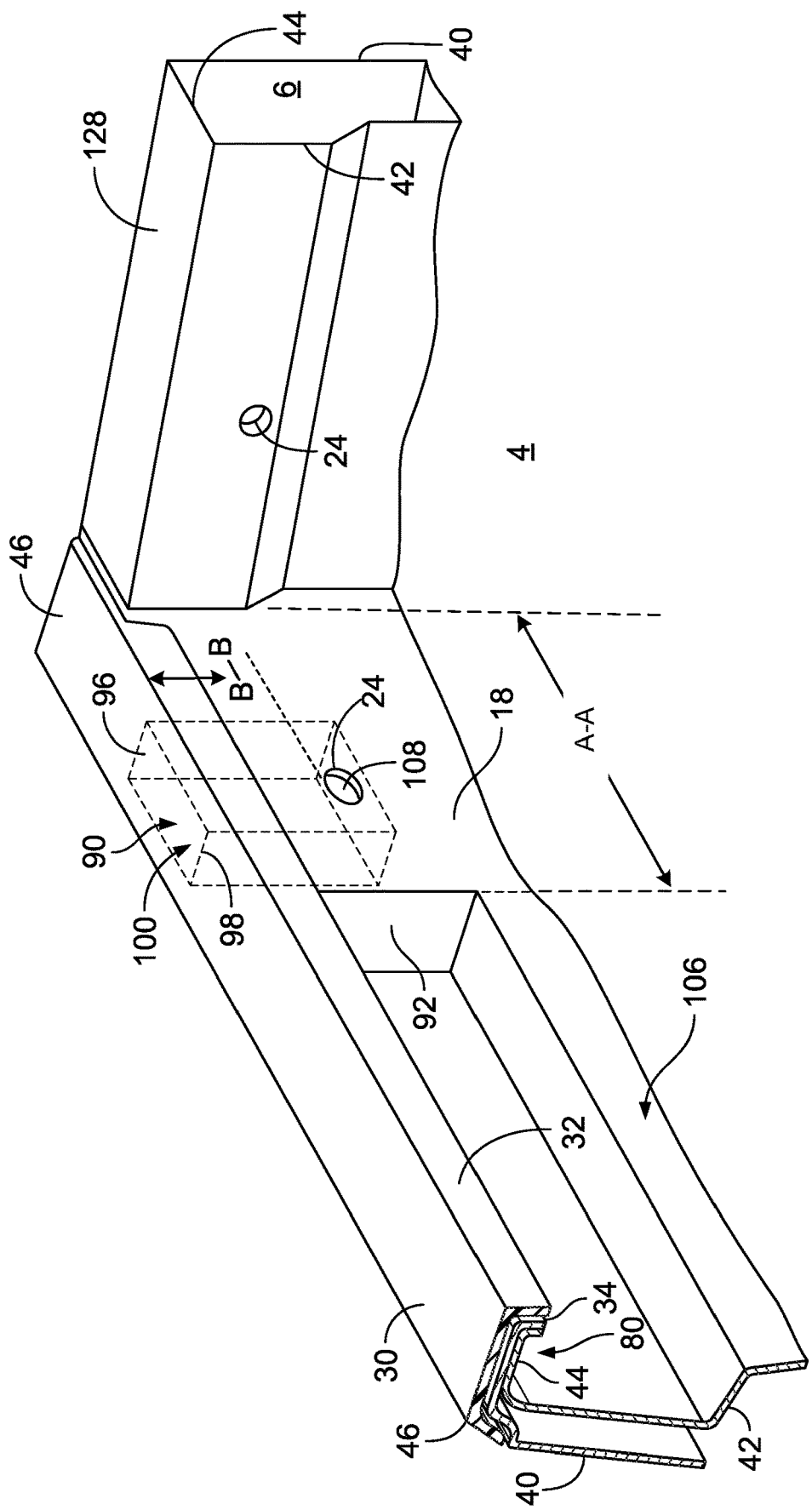
FIG. 3 is a sectional view of the front corner structures of a truck bed.

The open space formed under the top ledge of the opposed side walls extend between and terminates at the forward and rearward pillars. This configuration at the forward pillar is illustrated in FIG. 3 for descriptive purposes. Typical truck beds include stake hole pockets 90 which are accessed from the top ledge. The inner truck bed wall forms a 45 to 90 degree bend 92 at the exemplary front pillar to accommodate the stake hole pocket shown in doted lines. The pockets are as wide as the reinforced structure 44 between the pillars. The open space 80 terminates at the pillars so the inner truck bed wall forms a vertical structure extending from above the floor to or near the inside edge 34 of the inner side wall of the truck bed.

The width of the front pillar equals the distance between A-A. This distance is different for every make and model of pickup truck. The width of the front pillar may be, for example, 2 inches to 10 inches wide as measured from the bulk head to the open space where the undercut begins. The pillars at the rear and forward end of the side walls typically have apertures 24 on the side wall to access an interior wall 96 of the stake hole pocket structure. These pre-engineered holes 108 are reinforced or configured to support a load or mechanical force, as will be described below. The vertical position (B-B) of the pre-engineered holes on the pillars from the top ledge are not consistently located in any fixed position, but are rather situated as preferred by the truck bed manufacturers. The vertical position of the holes range from 2 to 8 inches from the top ledge.

In some truck embodiments the bed rail cap is continuous, concealing the top location of the stake hole pockets. In some truck embodiments the bed rail cap includes a marker 98 to delineate the location of the stake hole pocket, and this marker can be used as a guide to cut an opening in the bed rail cap to expose the stake hole pocket. In yet other embodiments, the bed rail cap is discontinuous with a opening 100 to expose the interior space defined by the stake hole pocket.

In some truck bed embodiments, for example the 2005+ Toyota Tacoma model, the side wall is continuous and excludes stack hole pocket structures, necessitating a pillar structure in the side wall, for example at the front corners. Instead, the Tacoma truck bed includes a utility track mounted below the inside edge of the plastic bed rail cap. The wall of the inside down turn lip 32 and the utility track are inline, such that the c-channel opening formed in the utility track is in vertical alignment with the inside wall 64 between opposed side walls.

Figure 4:
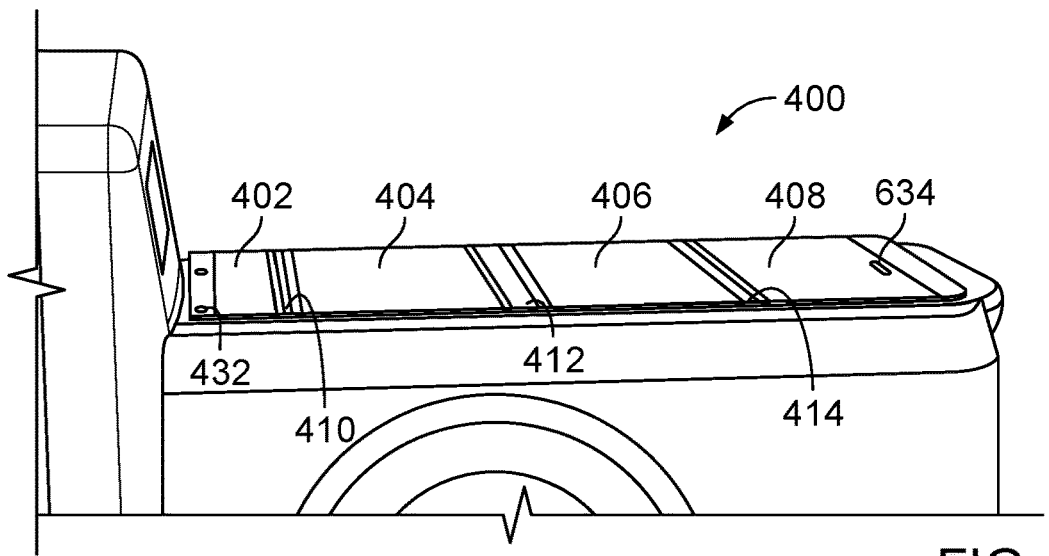
FIG. 4 is a view of the cover apparatus covering the truck bed.

Having described the structures of a typical truck bed, the disclosure now moves on to a description of the inventive apparatus for covering the open truck bed. As seen in FIG. 4, a folding cover assembly 400 is shown in a closed position on the truck bed. The assembly includes a front bulk head panel 402, a forward panel 404, a middle panel 406 and a rear panel 408. A first hinge mechanism 410 connects the bulk head panel to the forward panel. A second hinge mechanism 412 connects the forward panel to the middle panel. A third hinge mechanism 414 connects the middle panel to the rear panel. There may be more panels and hinges for longer truck beds.

Figure 5:
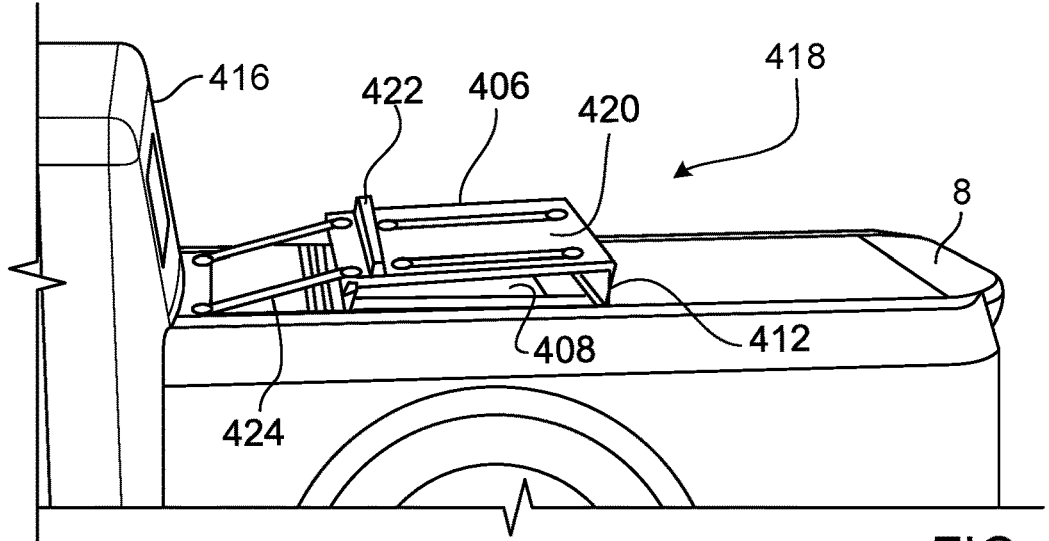
FIG. 5 is a view of the cover apparatus in a semi-open condition.

As suggested in FIG. 5 the panels flip open from the tail gate 8 toward the passenger cabin 416, in a semi-open configuration 418. The rear tail gate panel rotates 180 degrees to fold over the middle panel along the third hinge. Next the stack 420 is rotated another 180 degrees along the second hinge so the rear and middle panels fold over the forward panel. It is to be appreciated that on the underside of the panels are latch mechanisms 422 for securing the cover panels in a closed position over the open truck bed, as described further below. Additionally, in order to secure the stack for driving conditions, a strap and buckle mechanism 424 is provided to retain the stack is a fixed position with one of the latch mechanisms on the underside of the forward panel engaging the edge of the truck bed downturn lip.

Figure 6:
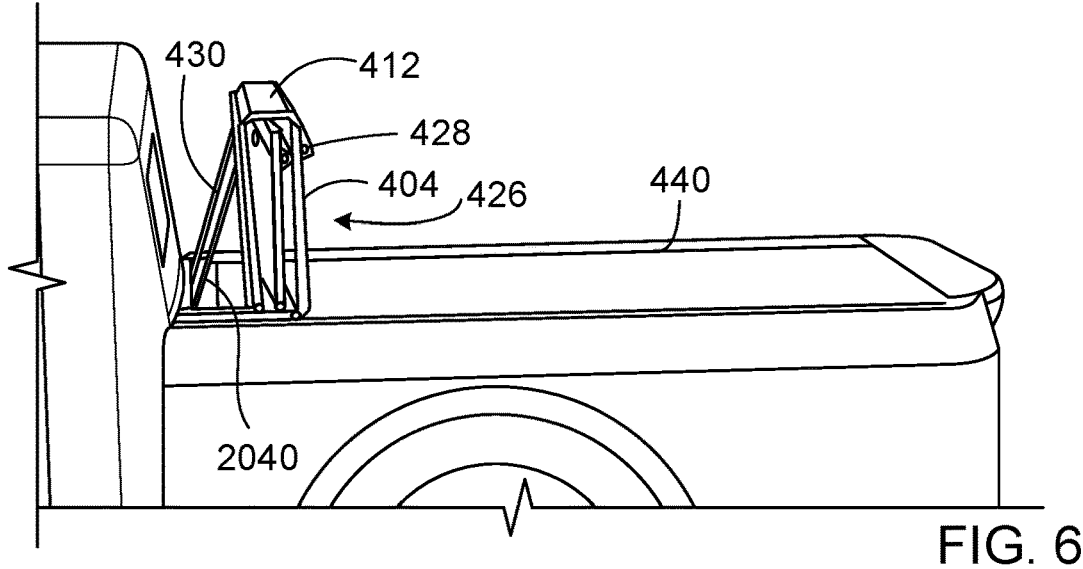
FIG. 6 is a view of the cover apparatus in an open position.

As seen in FIG. 6 the stack of three panels flip open along the first hinge +/−90 degrees, so that the stack is in a vertical position 426 behind the truck cabin. The forward panel latch mechanism 428 mounted to underside of the forward panel is disengaged to manually lift the horizontally disposed stack into the vertical position. A prop support mechanism 430 is provided to retain the stack in the vertical position. The prop support mechanism is affixed to the underside of the middle panel, and is released by hand to engage a support bracket 432 mounted to or along the front bulk head panel. In this configuration the truck owner has substantially full access to the open bed for carrying cargo and the like while driving.

As see in FIGS. 4, 5 and 6, the inside margin 440 of the top ledge of the truck bed 30 and Lip 32 is devoid of any assembly hardware, such as auxiliary side rails with clamps, associated with the prior art. It is to be appreciated that the prior art assembly side rails, clamps and drain tubes and the like are often times in the way of large or bulky cargo items, which can impact and dislodge the assembly hardware or can be impacted to dent, scratch or damage the cargo. An unobstructed open truck bed is another advantage of the present apparatus for covering an open truck bed with a folding truck bed cover.

Figure 7:
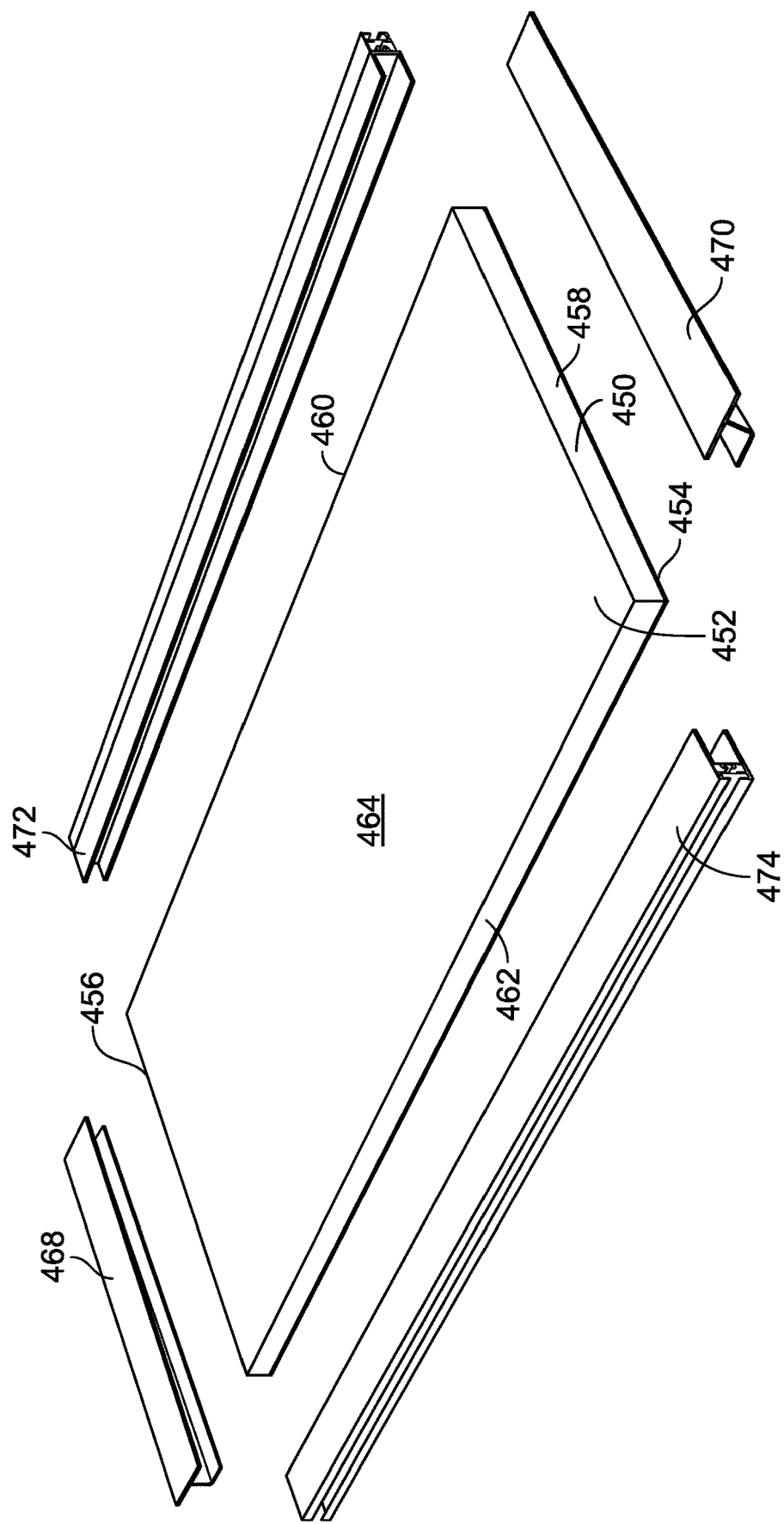
FIG. 7 is an exploded view of the construction of a cover panel.

Turning now to the structure of a typical panel in FIG. 7. A light weight core material 450 is covered with a top surface layer 452 and a bottom surface layer 454 to form the rough panel. Numerous core materials are found to be useful including foam, cardboard, honeycomb and the like. Numerous surface layer materials are found to be useful including aluminum, steel, metal alloy, plastic and composite sheeting.

The panels are sized to span the width of the truck bed and have driver and passenger side lateral edges 456 and 458 respectively. The panels are further sized for the length of truck bed and have a forward edge 460 and a rearward edge 462. Each rough panel assembly 464 receives a four part frame 466 comprising driver and passenger side rail frame elements 468 and 470 respectively and forward and rearward rail frame elements 472 and 474 respectively. Numerous frame materials are found to be useful including extruded aluminum, plastic and composites, although aluminum profiles are preferred for light weight, rigidity and recyclability. The frames elements are press fit and bonded with adhesives and sealants to the outer edges of the rough panels cut to specific dimensions. Additionally, inserts, screws and fasteners can be used to secure the frame elements to the lateral and leading edges of the panels. Combinations of adhesive, sealants, inserts and fasteners are preferred to provide watertight and mechanically strong panel structures.

Figure 8:
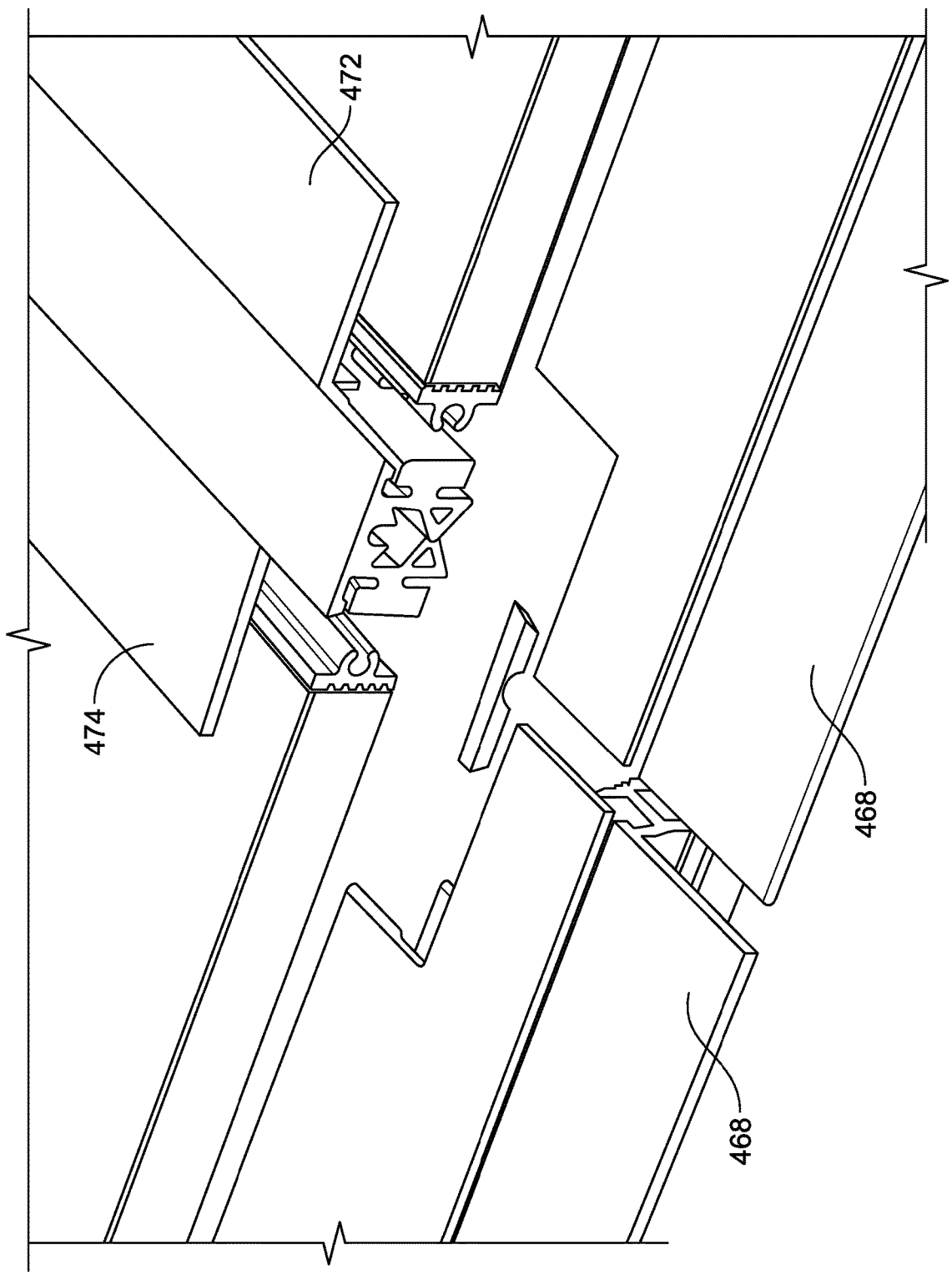
FIG. 8 is a partial sectional view in perspective showing the intersection of the frame sections at two corners.

As seen at FIG. 8, the corners of four part frame may be notched, cut or machined to provide a desirable watertight structure or finished appearance.

Figure 9:
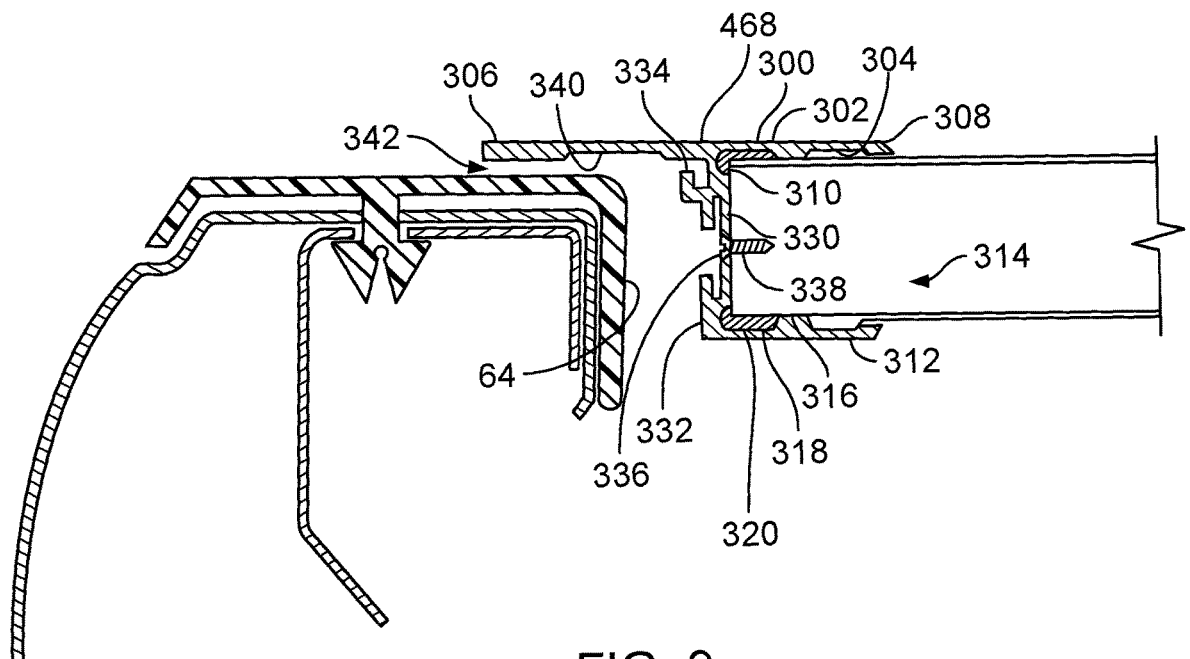
FIG. 9 is a cross section showing a cover panel positioned over the truck bed.

As seen in FIG. 9 the driver side rail frame 468 suspends the cover panels substantially flush with the top of the truck bed. The side rail is defined by a top wall 300 having a top surface 302 and a bottom surface 304. The top surface is substantially flat and terminates in an outer edge 306 and an inner edge 308. Depending from the bottom surface is a vertical column 310. The vertical column extends downward to a bottom wall 312 with an upper surface 316 that projects laterally below the inner edge. The top wall and bottom wall joined by the column forming a panel c-channel 314 to receive the lateral edges of the unitary panel member. The top and bottom walls have depressions 318 formed to receive an adhesive sealant 320. Similarly, the underside of the top inner edge includes an array of depressions to receive adhesive sealants. The adhesive sealants provide a means of affixing or bonding the side rail to the lateral edge of the panel as well as providing a watertight seal there between to prevent entry of liquid into an interior space of the truck bed cargo area.

The vertical column of the side rail is further defined by an inside wall 330 facing the core material and an outside wall 332 facing the truck bed. The outside wall is defined by a top boss 334 and a T slot 336. A fastener 338 may also be inserted through the t-slot opening and vertical side wall into the core material to establish a mechanical fitment. The core material may be strengthened with an insert (not shown) to increase the strength of the fastening element.

The top wall outer edge extends over the top of the truck bed by a predefined distance in order to support the weight of the apparatus plus a 300 to 400 pound evenly displaced snow load or the like. The strength of the top wall is determined by its thickness and extension over the truck bed. A typical extra short full size truck bed measures +/−60 inches wide and +/−67 inches long, so that there are +/−250 linear inches of surface support around the open top of the truck bed. If the 400 lbs of evenly displaced static load is distributed along 250 inches of lateral support, each linear inch of the outer edge will be required to support less than 2 pound of load. This means the wall thickness of the outer edge of the side rail frames can range from 0.5 mils or 1/64 inches to 3 mill or 3/32s without deflection.

However, in a dynamic load condition, as suggested in FIG. 6, the weight of the apparatus must be supported by the side rail frame members of the bulk head panel alone. If the apparatus weighs 65 pounds and is subjected to driving or G forces, the thickness of the outer edge will have to support +/−20 lbs of load per linear inch. Therefore, the thinnest wall thickness of the side rail has to be at least 0.5 mil or 0.065 inches in wall thickness, although thinner and thicker wall thicknesses can be employed depending upon the width of the outer edge span over the truck bed side walls.

Figure 12:
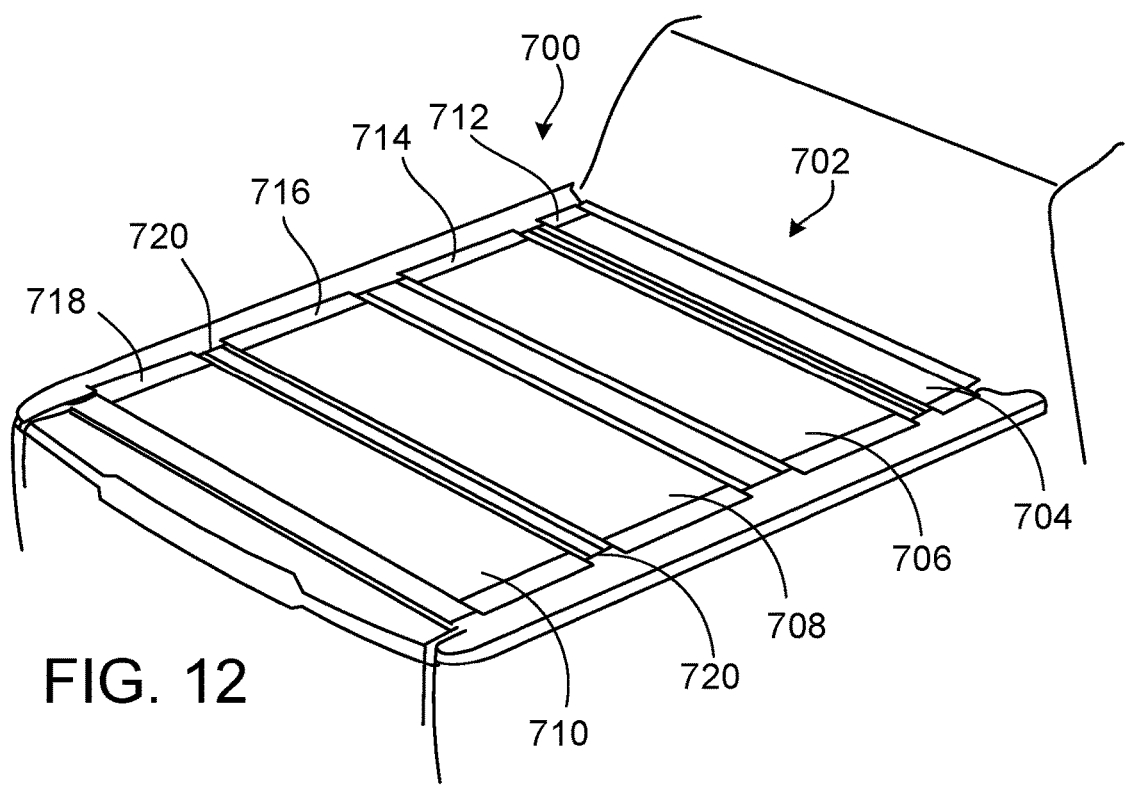
FIG. 12 is a perspective view showing the gaps between the panel sections.
Figure 13:
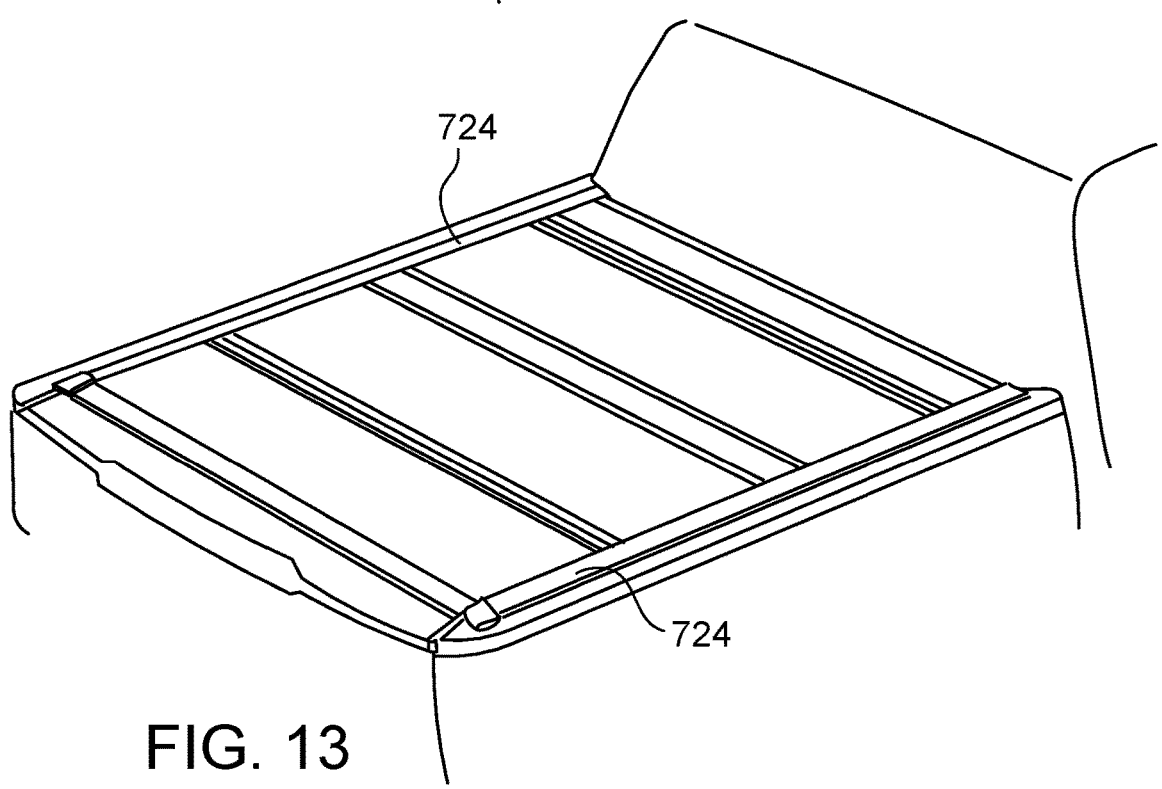
FIG. 13 is a perspective view showing how a continuous rubber strip covers the gaps.

It should also be appreciated, in the context of FIG. 12, that in the present example of an extra short bed pickup truck 700, the apparatus 702 will include four panels (704, 706, 708, 710) and eight side rail sections (712, 714, 716, 718). Each side rail section is cut to a length generally equal to the front to back widths of the panels, or as suggested in FIG. 8. In any case, this will leave six gaps 720 between the panels, at the hinge connections. The ascetic appearance is compromised by the arrangement, so that when the apparatus is placed upon the truck bed the side rails are discontinuous and look odd, plus the open spaces between the panels would admit rain and dust into the interior of the truck bed. Therefore, as seen in FIG. 13 a pliable rubber or EPDM gasket strip 724 is provided to conceal the gaps.

Figure 10:
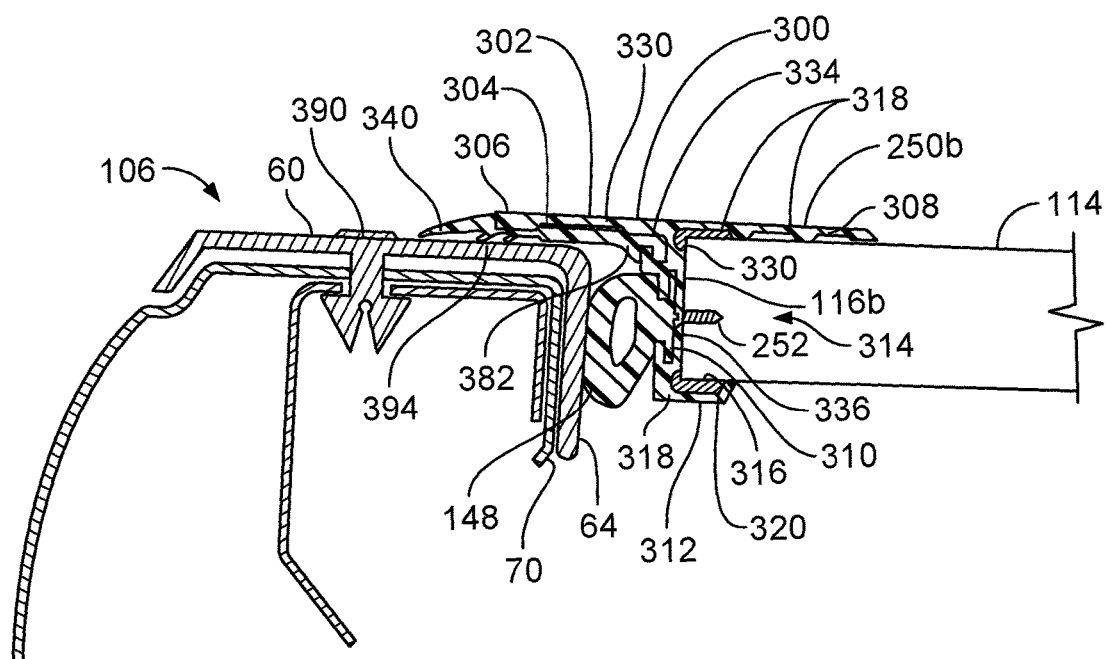
FIG. 10 is a cross section showing the gaskets sealing the cover panel over the truck bed.

Referring back to FIG. 9, the bottom surface 340 of the outer edge of the side frame element, which sits on the top of the truck bed, also creates an avenue 342 for water and dust to enter the interior space defined by the covered truck bed. Therefore the side rail members are adapted to receive weather strips and sealing gaskets. As seen in FIG. 10 a first weather strip 148 is inserted into the T slot to create a first seal between the side rail member and the inside wall 64 of the truck bed. This weather strip is dense and resilient for at least a 5 year open and close duty cycle of at least 4000 times.

A second weather strip 382 is inserted into the top boss 334 and double sided adhesive tape 384 positioned inside a depression of the underside of the outer edge is used to create a sealing means between the top of the truck bed and the bottom of the side rail element. It should be noted the top of the truck bed may include ribs 390 and the sealing means accommodate such ribs with flexible fins 394, low density foams or combinations thereof. Alternatively, as seen in FIG. 11, the first weather strip 380 may be combined with the second weather strip 382, as a third single weather strip 396.

The pliable rubber or EPDM gasket strip 724 and second weather strip 382 or third weather strip 396 can alternately be made from one piece or two separate pieces. The strips may include one or more double sided adhesive tapes 384 to bond the strip to the top surface and the bottom surface of the side frame elements. Additionally, the top strip can include a leaf 388 to be sandwiched between the side rail and the top surface 452 of the panel to retain the top strip in a fixed position.

Figure 11:
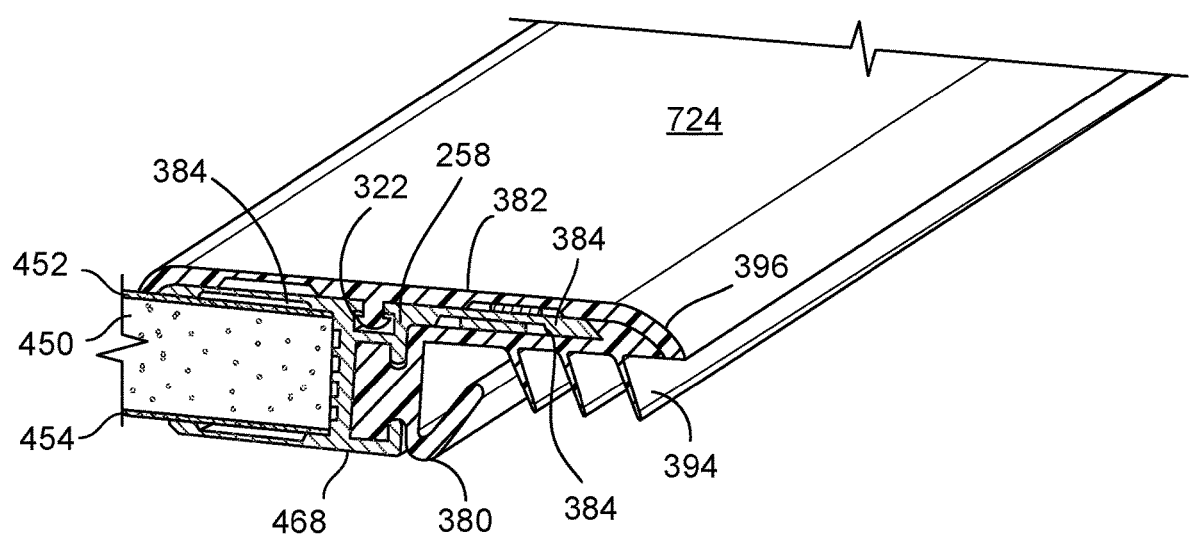
FIG. 11 is a perspective cut away view of a preferred structure of the driver side frame element including gaskets.

As seen in FIG. 11, the side frame elements 468 can include a T slot channel 258 formed in the top wall to receive a t shaped projection 322 extending from the gasket strip 724.

Figure 14:
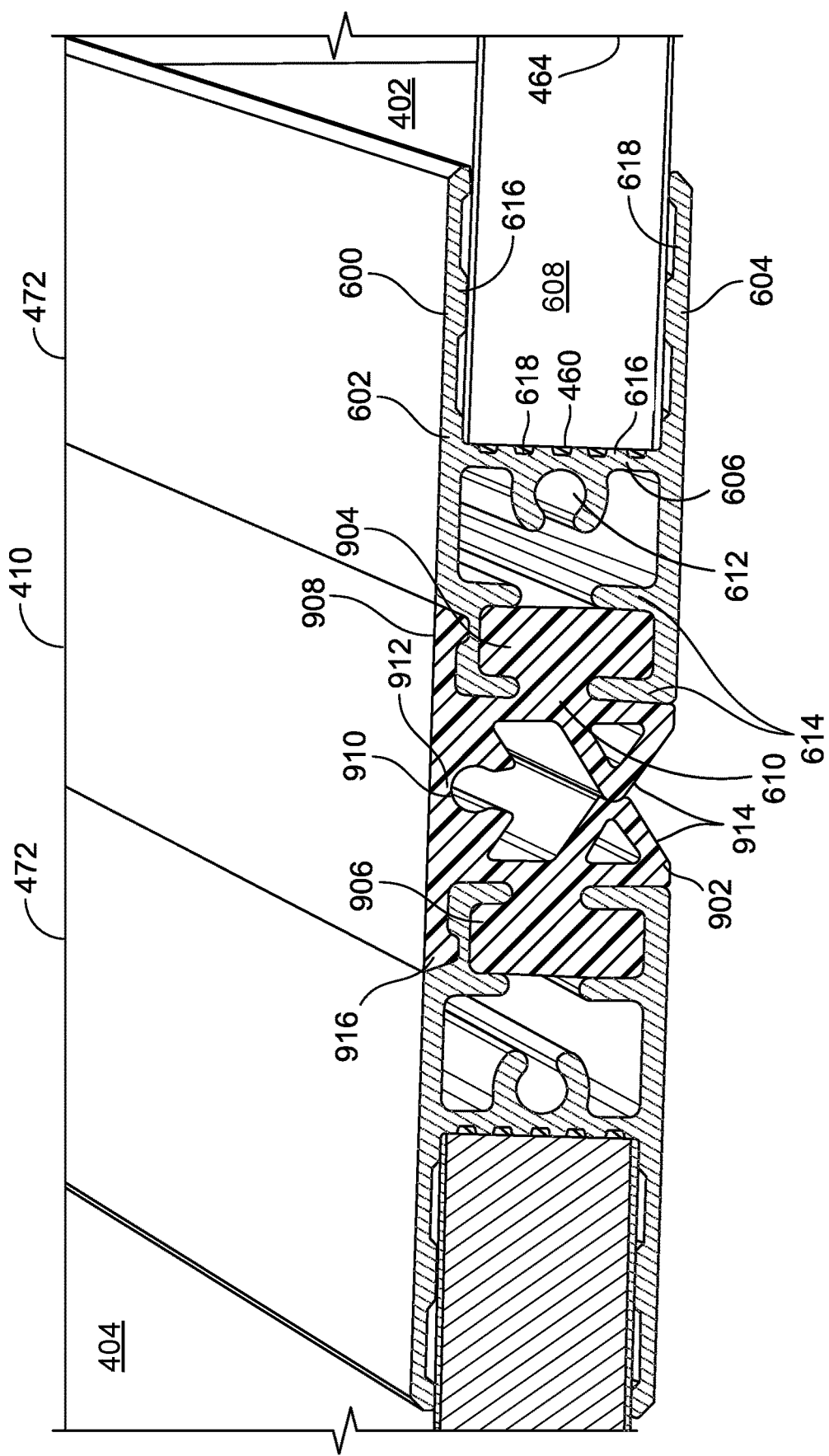
FIG. 14 is a perspective cut away view of the hinge structure between two adjacent middle and rear panels.

Referring to FIG. 14, we now look at the hinging aspects of the forward and rearward rail frame elements 472 and 474. The rail frame element 600 include a top section 602 and a bottom section 604 joined by central section 606. The top and bottom portions extending away from the central section define a C channel 608 to receive a leading forward edge 460 of the panel assembly 464. The central section includes a t slot 610, a boss 612 and support walls 614. The inside surfaces 616 of the C channel include indentations 618 to increase the bonding surface area between the fore and aft edges of the panels.

The forward and rearward rail frame elements and side rail frame elements are mitered at the four corners, as seen in FIG. 8 to establish a perimeter margin enclosing the outer edges of the panel. The lateral edges of the panel assembles retained within the c-channel sections by a sealant, adhesive, caulking or mastic putty material to prevent the ingress of water into the cover assembly and into the truck bed.

Now moving on to the hinging elements described in FIG. 4 in which a first hinge mechanism 410 connects the bulk head panel to the forward panel. A second hinge mechanism 412 connects the forward panel to the middle panel. A third hinge mechanism 414 connects the middle panel to the rear panel. The hinge mechanisms include the mating male to female t-slots of the forward and rearward rail frames and a flexible rubber extrusion.

The hinging mechanism in FIG. 14, located between the bulk head panel and the front panel includes a flexible rubber extrusion 900 configured to join adjacent panels in a side by side relationship suitable for allowing the panels to fold up to 180 degrees. The first hinge mechanism 410 includes a rearward facing rail frame element 474 with a t slot forming the bulk head panel 402, a forward facing rail frame element 472 with a t slot forming the forward panel 404 and a double sided t slot extrusion 902 made of flexible rubber or epdm materials and composites. The extrusion 902 is configured to allow the panels to rotate +/−90 degrees, as suggested in FIG. 6.

The side profile of first hinge extrusion 902 exemplifies the necessary elements of the apparatus. The first hinge extrusion includes a forward T slot projection 904 and rearward t slot projection 906. The male and female elements forming the t slot fit together through a sliding engagement with the T slot 610 of the rail frame members. The first hinge extrusion includes a top surface 908 bridging the gap between the panels. The first hinge extrusion further includes a hinging fulcrum 910 comprising a narrow section 912 enabling a linear fold of the reference panels into a 90 degree or vertical position between the driver and passengers sided of the truck bed.

Added elements of first hinge extrusion may include bumper elements 914 preventing the panels from rotating beyond a closed position over the truck bed, wherein the side by side panels are maintained in a parallel plane coexistent with the top of the truck bed. Tabs 916 are provided to increase the surface area for creating a water tight seal between the rail frames members and the hinge extrusions.

The side profile of the second hinge mechanism 412 of the apparatus is dissimilar to the first hinge mechanism 410 because spacing is required between the forward panel 404 and middle panel 406 to enable the rear panel 408 and middle panels to flip open into a stacked configuration over the forward panel as seen in FIG. 5. The spacing is required to account for the thicknesses of the folded panels. As described below, the width measurements include the panel thickness plus the latching means on the underside of the panels. The latching means will be described below in detail.

Figure 15:
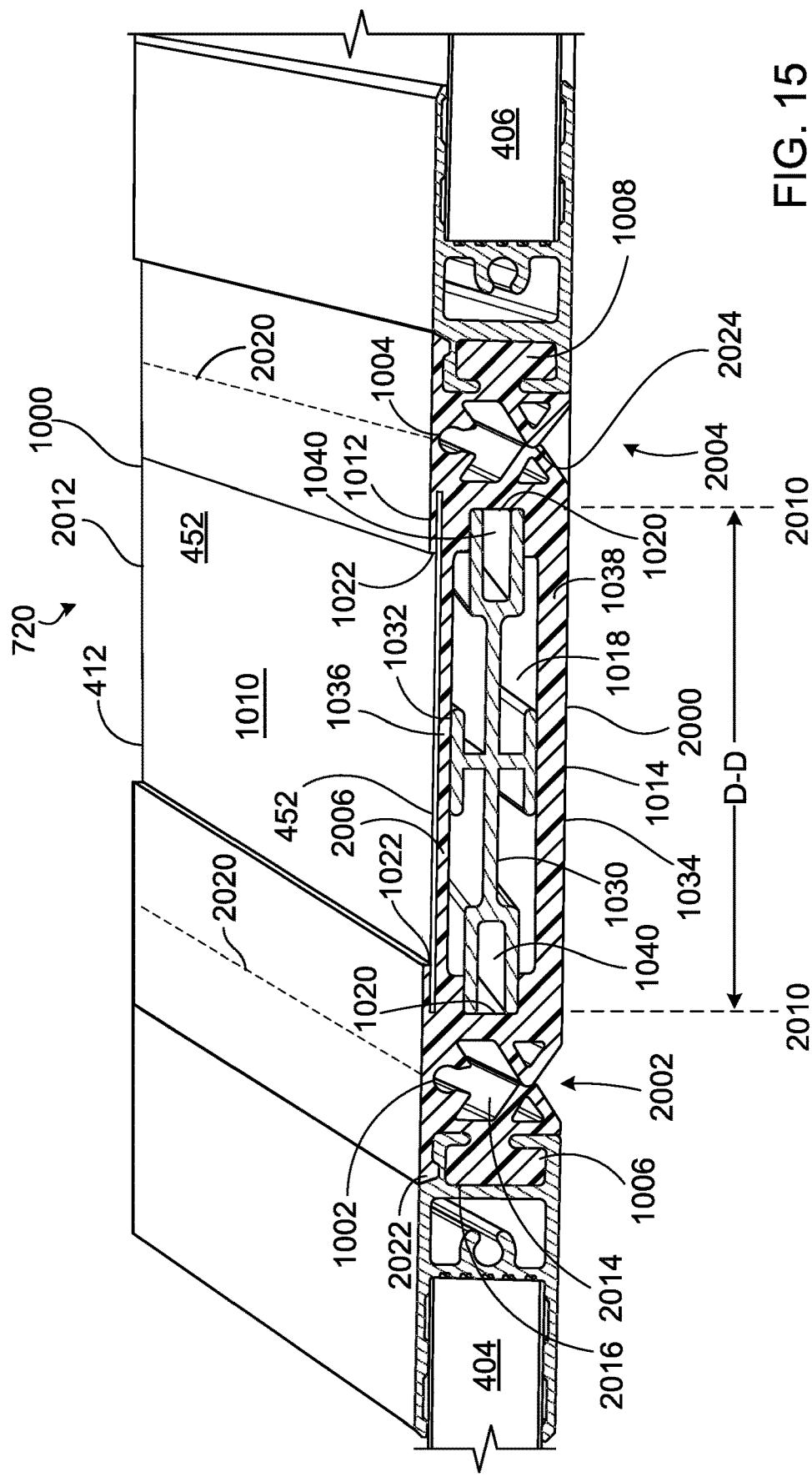
FIG. 15 is a perspective cut away view showing a wider rubber hinge structure between two adjacent front and middle panels.

The second hinge mechanism is shown in FIG. 15. The second hinge extrusion 1000 includes the same forward and rearward structures of first hinge extrusion 902 including two t slot projections or male ends 1006 and 1008. The main difference is the t slot structures are separated by a wider top surface 1010 bridging the gap 720 between the panels. The second hinging extrusion includes a forward hinging fulcrum 1002 and a rearward hinging fulcrum 1004, where as the first extrusion includes only one intended hinge point or bending fulcrum. The bridging section D-D includes a top surface 1012, a bottom surface 1014 and an open space 1018 which may include opposed indents 1020. Optionally the top surface can include opposed channels 1022 to receive an insert section of the top surface layer 452.

An exemplary structural member 1030 is inserted into the open space. The structural member may be extruded in aluminum or a rigid composite material and includes a top wall 1032 and a bottom wall 1034 positioned to prevent deflection of the second hinge extrusion top wall 1036 and the bottom wall 1038 between the fulcrums. Additionally, the structural member includes opposed channels 1040 which are configured to accept screws such as fastener 338, for attaching a side rail member 468 or 470 onto the opposed ends of the second hinge mechanism to close the gaps 720.

In further detail, the double sided synthetic rubber hinge includes a main body 2000 and first end section 2002 abutting panel 404 and second end section 2004 abutting panel 406. The end sections extend laterally from the opposed end walls 2010 formed by the main body. The main body and end sections are extruded as one flexible rubber profile 2006 wherein the top surfaces of the main body and the end sections form a uniform plane across a top face of the rubber hinge 2012.

The end sections include first and second open channels 2014 that have side walls 2016 extending up from the bottom surface 1014 to a hinging fulcrum below the top surfaces and below the top face. Hinging fulcrums 1002 and 1004 have a reduced wall thickness less than a wall thickness of the top surface and bottom surface of the top wall of the main body. The hinging fulcrums allow the double sided rubber hinge to rotate about the dashed lines 2020 in FIG. 15.

The end sections also include tabs 2022 which are margins of increased thickness which are provided to engage elements of the panels to restrict the penetration of liquids between the panel assembly and the double sided synthetic rubber hinge during use. Additionally, the channel walls may include bump stops 2024 comprising a male projections interfacing with a female tipped projection, such that the bump tops restrict the panels from over hinging in the flat position under the deflective forces of a snow load, for example.

The third hinge mechanism includes the same features of the first and second hinge mechanisms except the third hinge mechanism is narrower than the second hinge mechanism and may include one or more fulcrums. If the cover consisted of five panels because the truck bed is longer, a fourth hinge mechanism is required having double sided t slots and a complementary width.

Now moving onto the structure of the front bulk head panel 402 and means to fasten the apparatus to the truck bed. It should be appreciated the front bulk head panel in FIG. 4 can be one of a multi-part structure or a unitary part.

Figure 16:
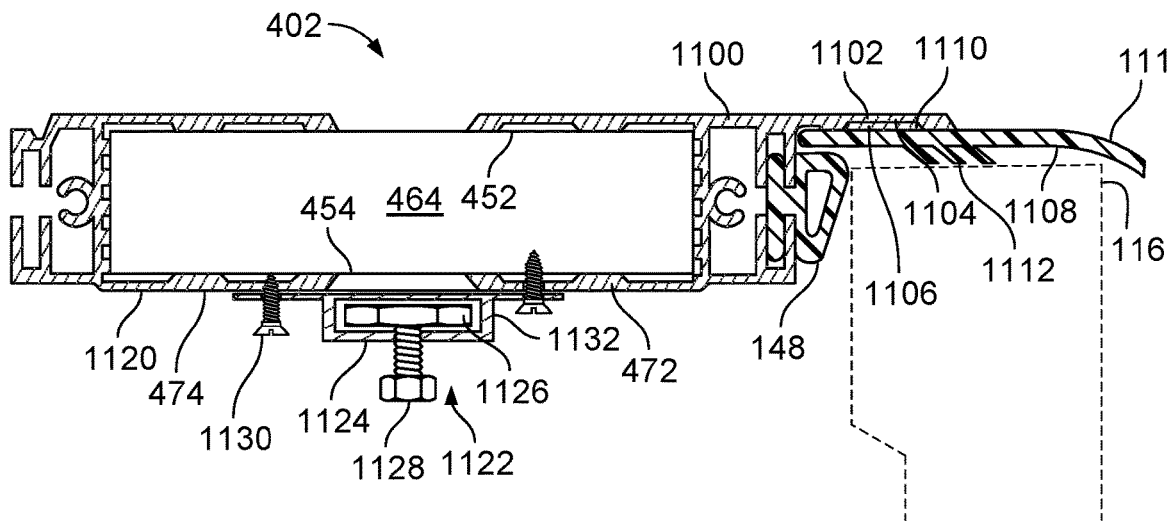
FIG. 16 is a cross section showing components of a multi-part bulk head panel.

As suggested in FIG. 16, the front bulk head panel comprising a core panel 464 a forward rail frame element 472 and a rear rail frame element 474. Such an arrangement is shown in cross section where the forward rail 472 includes a top wall 1100 with a projecting section 1102 extending forward over the top of the bulk head (shown in phantom) of the truck bed. The bottom surface 1104 includes a recess 1106. A flexible weather strip 1108 with a double sided adhesive tape 1110 positionable inside the recess is used to establish a seal with fingers 1112 to block water penetration with an extended flap 1114 to curve over the outer edge 1116 of the bulk head.

On the underside 1120 of the front bulk head panel include fastening means 1122 for mechanically attaching the apparatus against the bulk head between the two forward sides of the truck bed. The component elements of the fastening means includes a t-slot channel 1124 sized for a corresponding carriage bolt 1126, or the like, and nut 1128 or the like. Self tapping crews 1130, rivets and the like secure a flanged t-slot extrusion profile 1132 into place on the underside of the front bulk head panel.

Alternatively, instead of assembling a core with a four piece frame and a fifth t-slot extrusion profile, involving adhesives, fasteners and hand assembly, the front bulk head panel can alternatively be constructed from a unitary extruded cross member +/−9 inches in width (C-C).

Figure 17:
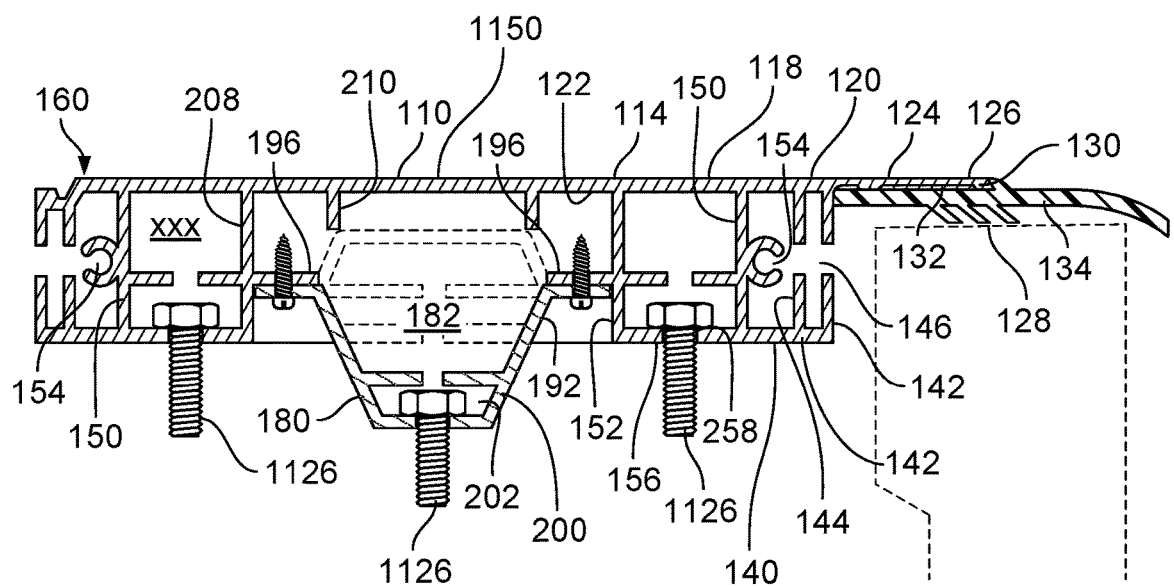
FIG. 17 is a cross section showing the structure and components of a unitary bulk head panel.
Figure 18:
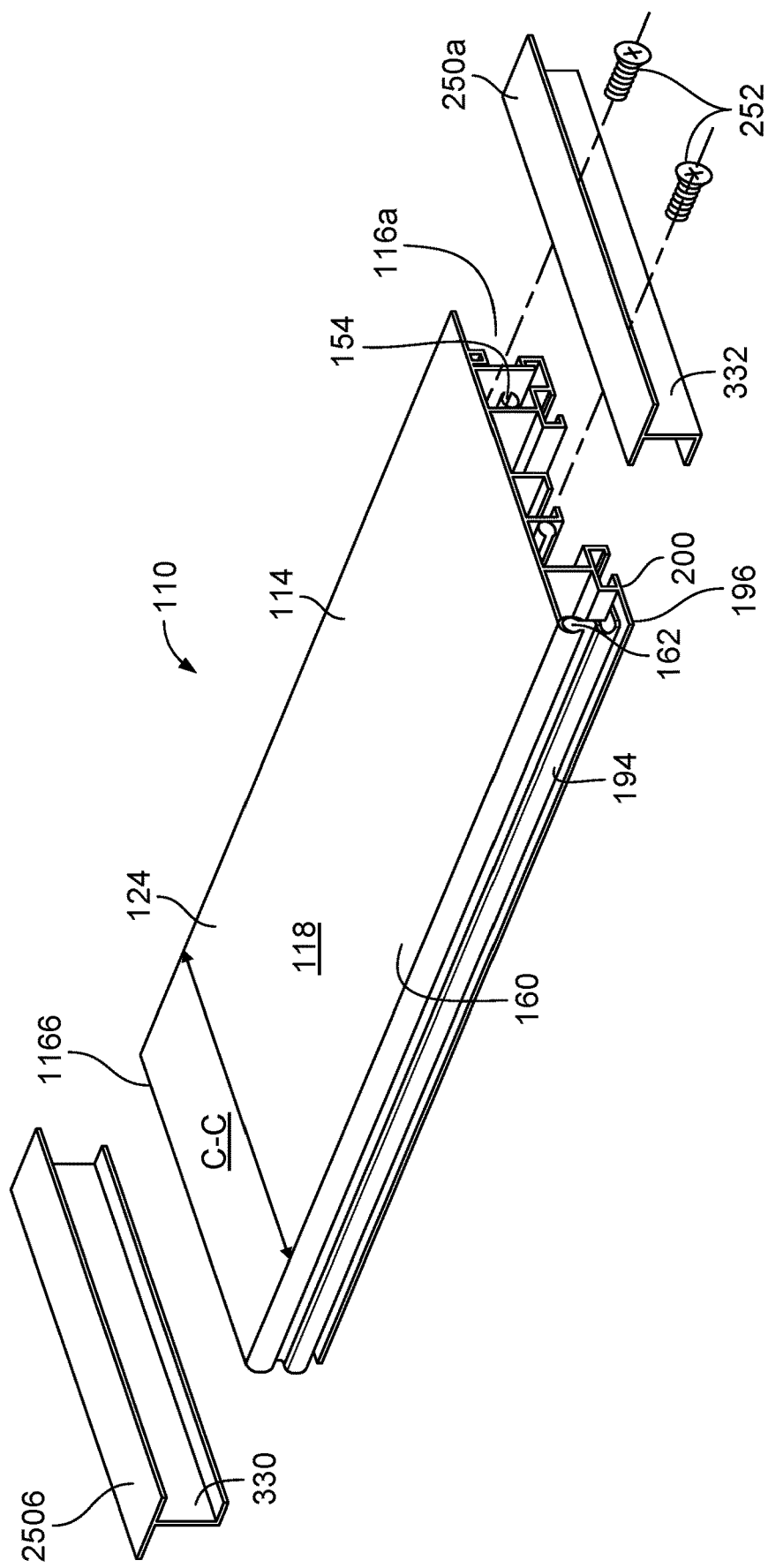
FIG. 18 is a perspective exploded view of the side rails attached in relation to a bulk head panel.

A one piece bulk head panel 110 is shown in FIG. 17 (Panel 402). The one piece bulk head panel is preferably extruded from an aluminum alloy, although alternate extrudable materials can be used as preferred by the practitioner. The bulk head panel comprises a unitary extruded member 114 with right and left lateral edges 116a and 116b respectively, as seen in FIG. 18. The extruded profile of the bulk head panel shown in FIG. 17 presents the right lateral edge, corresponding to the passenger side of the truck bed. The unitary member is defined generally by a continuous top section 118 having a top surface 120 and bottom surface 122. The bottom surface includes intermediate ribs 210 to add strength. The top member includes a forward portion 124 which extends to a forward end 126 located over a forward top ledge 128 formed by the forward bulk head. The forward portion has a leading edge 130 and its underside includes a recess 132 to receive a sealing member 134 in the form of a rubber flap.

Below the forward portion is a forward box structure 140 depending downward from the bottom surface of the top member. The forward box structure comprises a t-slot 146, rearward support walls 144, a first column 150 with a boss 154 and second column 152. First column 150 terminates in bottom wall 156 extending from the t-slot. In one preferred embodiment the forward box structure includes a t-slot channel 258 arranged to receive a fastener, such as a carriage bolt 1126.

The top member terminated in rearward portion 160 having a structure generally corresponding to the forward portion, but without the leading edge projecting over the bulk head. The rearward portion receives the flexible rubber extrusion 900 adapted to connect the bulk head panel to the forward cover panel.

The second column of the forward portion and the second column of the rearward portion include projections 196 which are orientated in a position parallel with the top member. The forward and rearward portions are joined by a bridge element 200 to close the middle box structure 182. In one preferred embodiment the middle bridge element is arranged to provide a channel structure 202 arranged to receive a fastener, such as a carriage bolt 1126 (shown in phantom).

Now moving on to FIG. 18, the lateral edges of the unitary extruded member or the multi-part panel receives opposed side rails 250a and 250b. The opposed side rails are affixed to the panel by means of screws 252 which self-tap into a plurality of bosses 154 formed in the columns and bridges of the unitary member or the frames of the multi-part member. As more fully described herein in connection with FIGS. 9 and 10, the opposed side rails overlap the opposed ledges of truck bed side walls to retain the bulk head panel in a fixed position that is both substantially flush between the top of the truck bed side walls and against the forward bulk head of the truck bed.

In yet another embodiment, the multi-piece front bulk head panel can omit the fastening means 1122 for mechanical attachment as suggested in FIG. 16. Alternatively, a pass-through hole in the core panel can be provided to receive a fastener through the top of the bulk head panel. This arrangement is shown in more detail in connection with FIG. 33.

Figure 19:
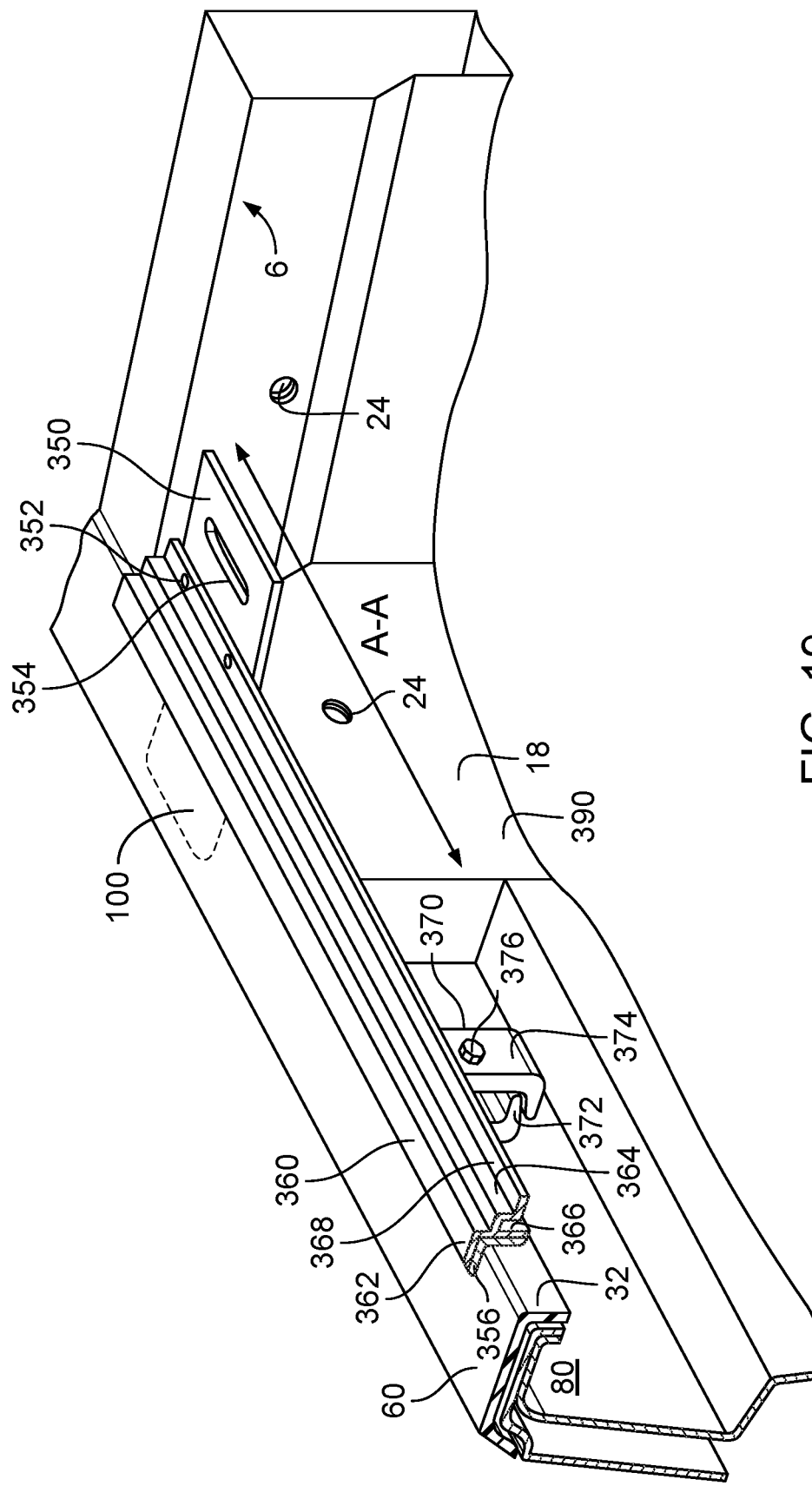
FIG. 19 is a partial perspective view of the front corner of a truck bed with prior art side rail structures mounted on the truck bed shown in section.

With further reference to FIG. 3, it will be appreciated that the front pillars blocks access to open space under the top ledge of the truck bed. As suggested in FIG. 19, representing the prior art arrangement, an auxiliary mounting rail 360, is affixed to top of the truck bed. The exemplary section of the auxiliary mounting rail which runs the entire length of the opposed truck bed side rails comprises a top surface 362 over lapping the plastic side rail cap and an inside structure 364 comprising clamping surface 366 and a support ledge 368 to support cover panels spanning the open truck bed (not shown). The auxiliary mounting side rail is held in place against the inside down-turn lip 32 by means of a plurality of two-part clamps 370, wherein an inside clamp element 372 is compressed against the down-turn lip proximate the edge by an outside clamp element 374 by tightening a pass through bold 376. Three or more clamps are use on each opposed side rail to secure the mounting rail to the top of the truck bed. The auxiliary mounting rail includes a forward clamping plate 350 which is affixed, for example by means of rivets 352 to the support ledge in a positioned adjacent the forward bulk head 6. The clamping plate includes a fastening slot 354 through which a fastener (for example carriage bolt 1126) projecting from the underside of a forward bulk head panel may pass through the fastening slot to engage a fastening nut or hand knob to retain the forward panel in a fixed position against the front wall bulk head.

As may be appreciated by a practitioner, the opposed auxiliary mounting rail assemblies add significant costs and complexity to the construction and installation of the prior art covers. The mounting rails also need to be sealed to the ledge to restrict the penetration of liquid into an interior space of the truck bed cargo area, requiring extra weather strips 356. The mounting rails running the length of the truck bed are typically greater than the width of the cover panels so that these are packaged in a second container or may be enclosed in a larger container than is required to package the cover panels alone, thus adding even more costs and complexity to the prior art articles and apparatus.

Figure 20:
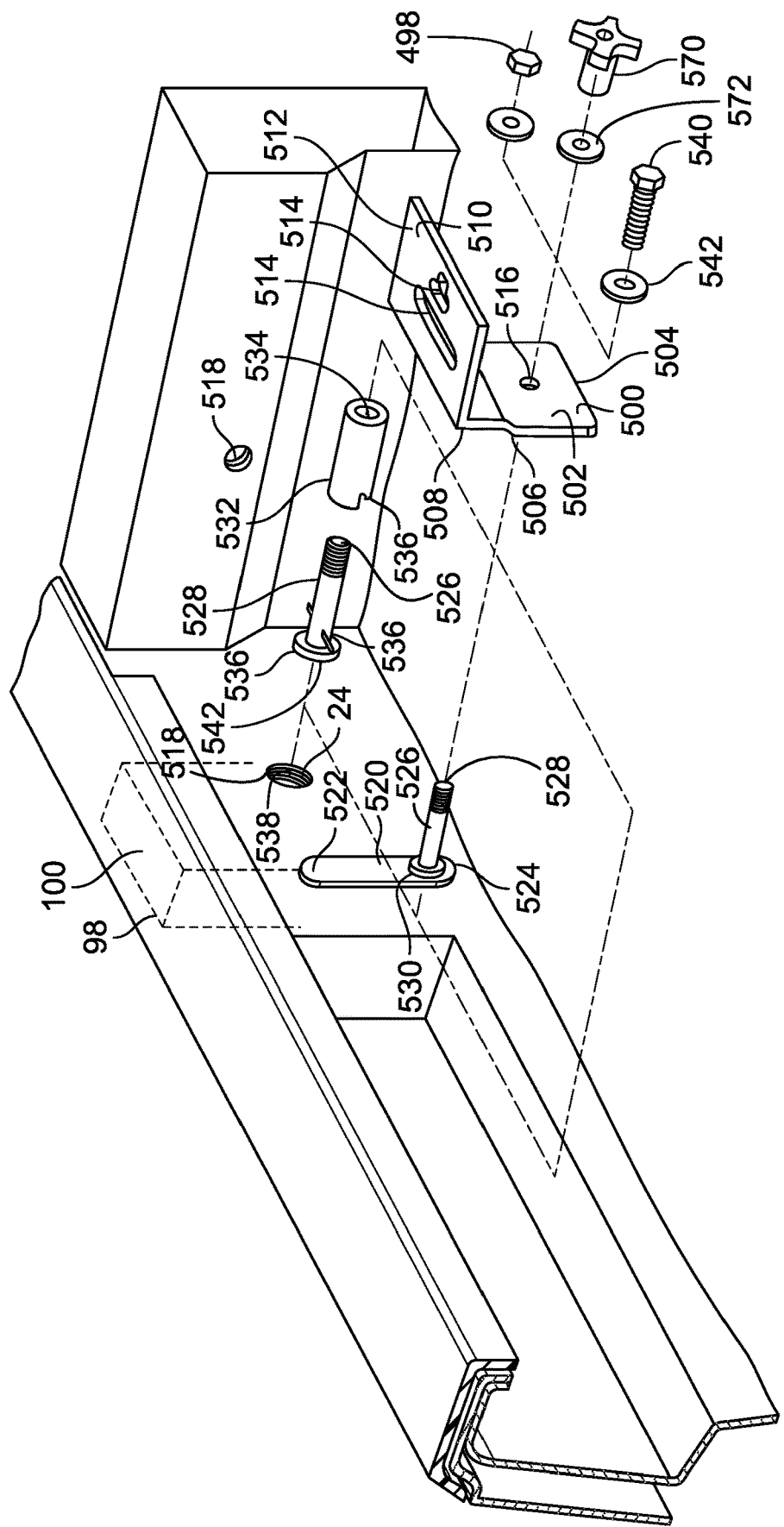
FIG. 20 is a partial perspective view of the front corner of the truck bed showing attachment means of the present invention.

FIG. 20 shows inventive embodiments that overcome the problems associated with forward pillars of conventional truck beds. It has been found that the apertures 24 contained in the opposed side walls of the front pillar or optionally the front bulk head wall can be utilized to secure the bulk head panel in a desired position against the inside wall of the bulk head as described below.

Aperture 24 on the side wall is not accessible through original equipment opening 100 to expose the interior space defined by the stake hole pocket on many truck models. Most customers do not want to cut an opening in the plastic bed rail cap to mount a folding cover assembly. Three preferred solutions are offered, wherein a side mounting plate 500 is secured to the front pillar through one such aperture. The side mounting plate is a formed with a vertical wall 502 having a width 504 greater than the diameter of the aperture and length 506 less than the distance B-B. The vertical wall is positioned against the side wall of the forward pillar. The upper margin 508 of the vertical wall is formed into a flat portion 510. The flat portion has a width and length and extends toward the interior of the open space of the truck bed. The flat portion forms a platform 512 to support the bulk head panel. The flat portion includes a top opening 514 to receive fasteners projecting downward from the bottom of the bulk head panel, for example a carriage bolt. The side mounting plate includes a side opening 516 juxtaposed to the location of the aperture 24 when positioned for assembly.

The side mounting plate is secured to the front pillar through the aperture by one of three preferred means. In the first means, a flat bar 520 with a width less than the diameter of the aperture and a length greater than distance between the forward and rearward interior walls of stake hole pocket structure, so as to prevent the flat bar from spinning within the pocket, is provided. The flat bar has a first end 522 and second end 524 with a fastening element 526, such as a threaded stud 528. The first end is inserted through the aperture into the open space of the stake hole pocket so that the stud is projecting from the aperture when it is positioned. The stud may include a shoulder 530 to prevent movement of the projecting stud relative the aperture during use.

In an alternated method, a rubber plug 532 with a diameter or width and length equal to the diameter or width and length of the aperture is inserted into the stake hole pocket through the aperture. The rubber plug has a pass through hole 534. A corresponding or equally dimensioned end plate 542 with a fastening element 526 and a anti-rotation feature 536 inserts through the aperture and passes through the through hole to project a distance beyond the forward pillar side wall to receive the side mounting plate and the thumb knob. The end plate compresses the rubber plug as the hand knob is tightened along the threaded stud projecting from the end plate. The expanded rubber plug has a diameter or a width and length greater and larger than the aperture when compressed by thumb knob or other nut style fastener, to thereby restrict movement of the side mounting plate relative the forward pillar side during use.

In yet another method, the aperture includes a threaded opening 518, or is modified with a press nut or the like to create a threaded opening. A bolt 540 is inserted through the side opening 516 into the threaded opening to compress the side mounting plate against the forward pillar to restrict movement therefrom.

Figure 21:
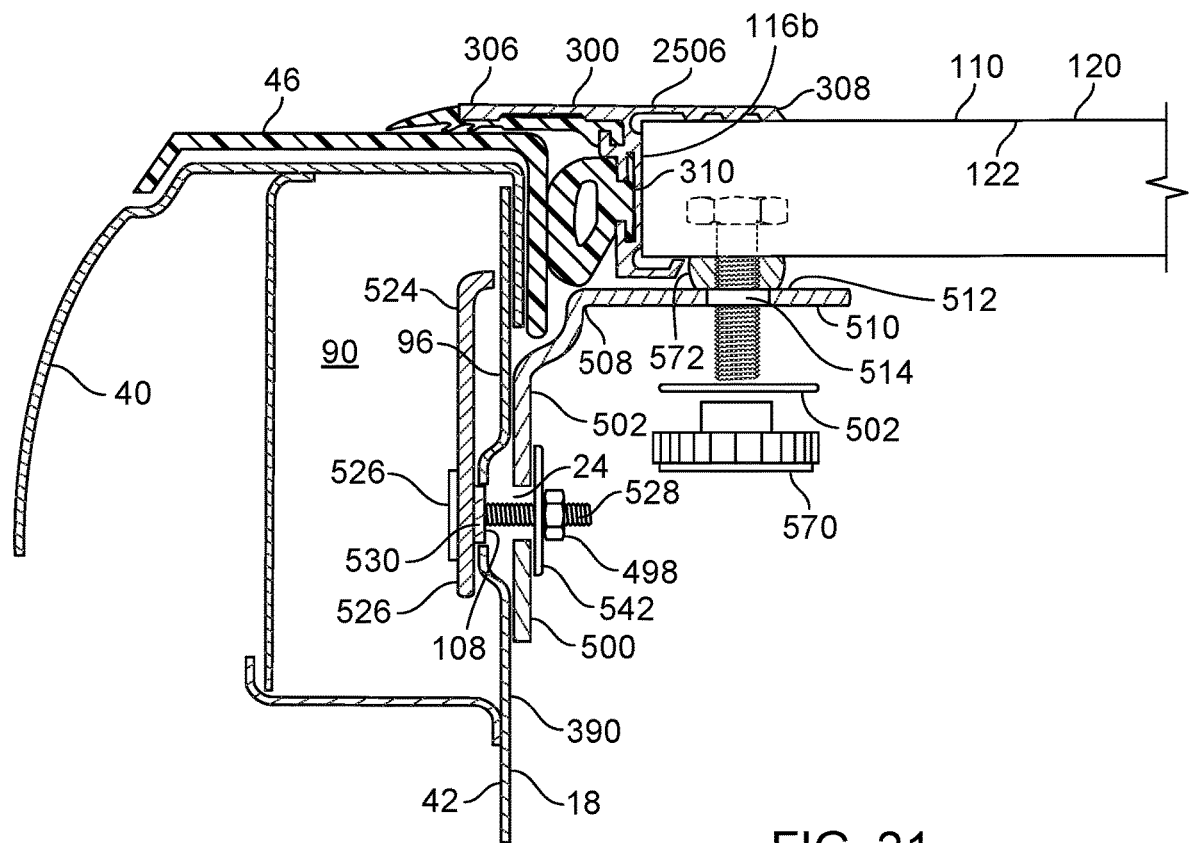
FIG. 21 is a cross section showing how the attachment means is positioned relative the bulk head panel and the front corner side wall.
Figure 22:
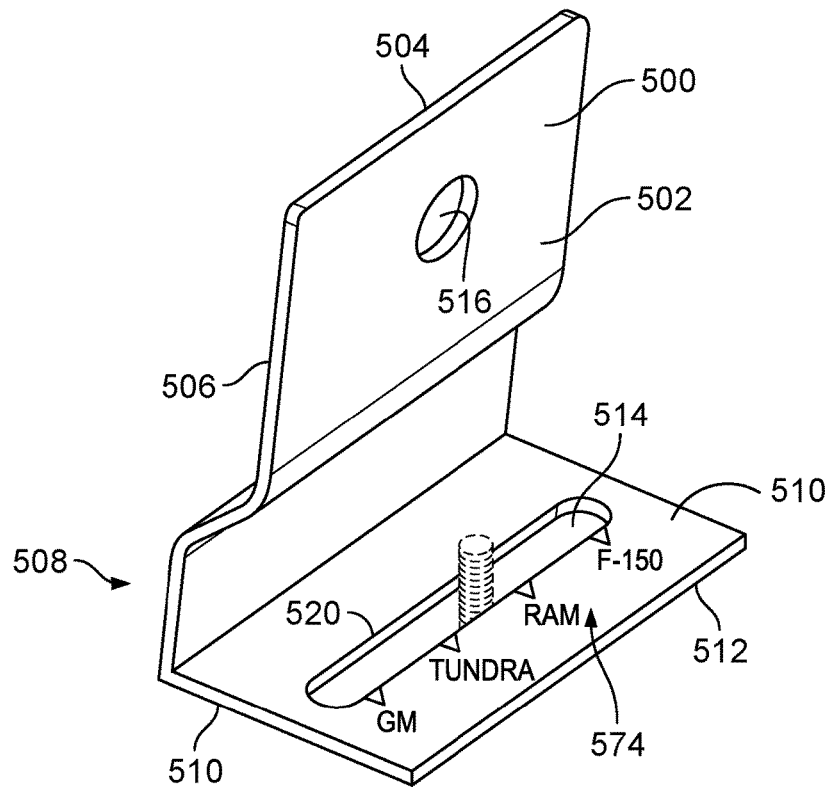
FIG. 22 is a perspective view showing the underside of one example of the side wall mounting plate.

A thumb knob 570 or the like receives the threaded stud in the preferred means and compresses the side mounting plate in a fixed position against the truck bed side wall as the thumb knob is hand tightened over the threaded stud. A rubber o-ring 572 may be used to between the panel and the plate. The hand knob can also be loosened to remove the side wall mounting plate on the fly. Further aspects of the fastening mechanisms are presented in FIGS. 21 and 22, including markers 574.

Now moving onto the latching mechanisms of the apparatus. Many prior art reference patents of record utilize a latching mechanism located entirely on a bottom surface of one or more of the folding panels. Such arrangements necessitate the lowering of the tail gate to access a latch release mechanism on the first folding panel. The present inventive approach utilizes a primary lockable latch release mechanism accessible from the top of the rear panel positioned adjacent the tail gate. The arrangement enables the rear panel to be opened without the need to lower the tail gate, providing increased convenience as well as added security. For example, even though modern day tail gates are lockable, the rear ward panels of the Bak style covers can be opened with the use of a coat hanger, or the like, by simply inserting the hook device between the top of the tail gate and the bottom of the cover to grab and yank the pull strap cable to open the cover to access cargo stowed within the truck bed. The lockable latch cannot be defeated in a like fashion, providing increase security and convenience.

Figure 23:
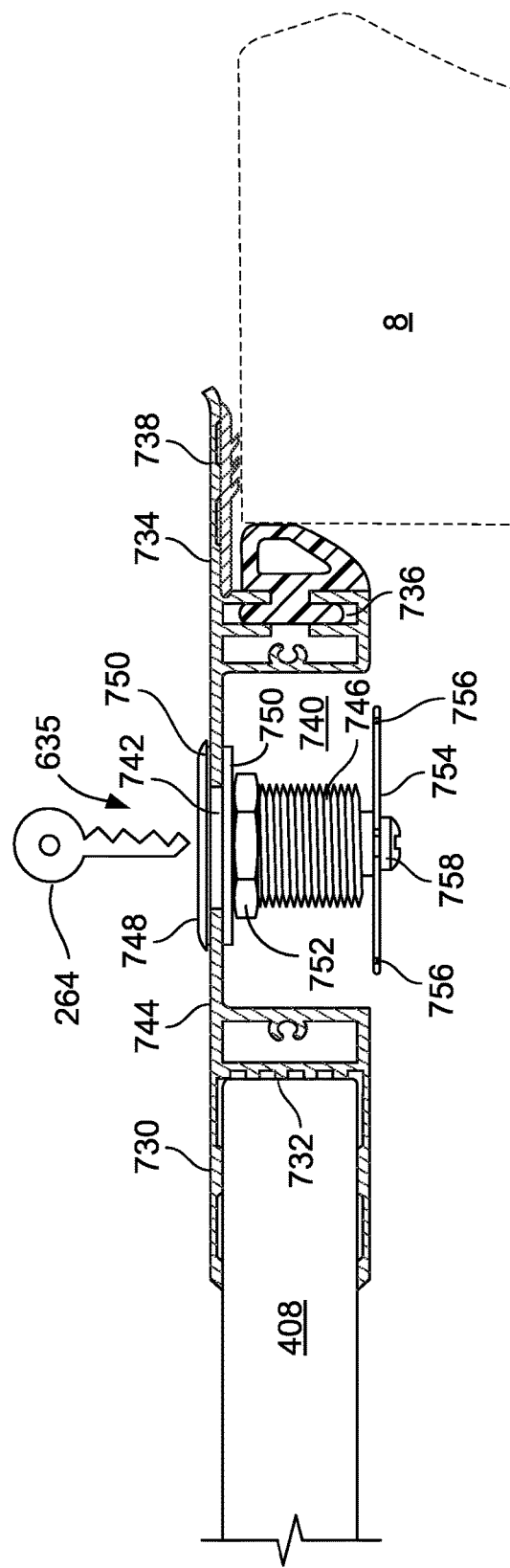
FIG. 23 is a cross section of the rear panel showing the central lock in relation to the top of a truck bed.

FIG. 23 shows a cross section of the apparatus positioned between the driver and passenger side walls (10 a & 10b) of the top of the truck bed. A driver side plunger assembly 630 and a passenger side plunger assembly 632 are connected to a central lockable latch 634. The plunger assemblies are located entirely under the panel assembly while the latch is located on top, inside and below the panel assembly. The plungers are connected to the latch by a cable or braided wire 670.

Figure 25:
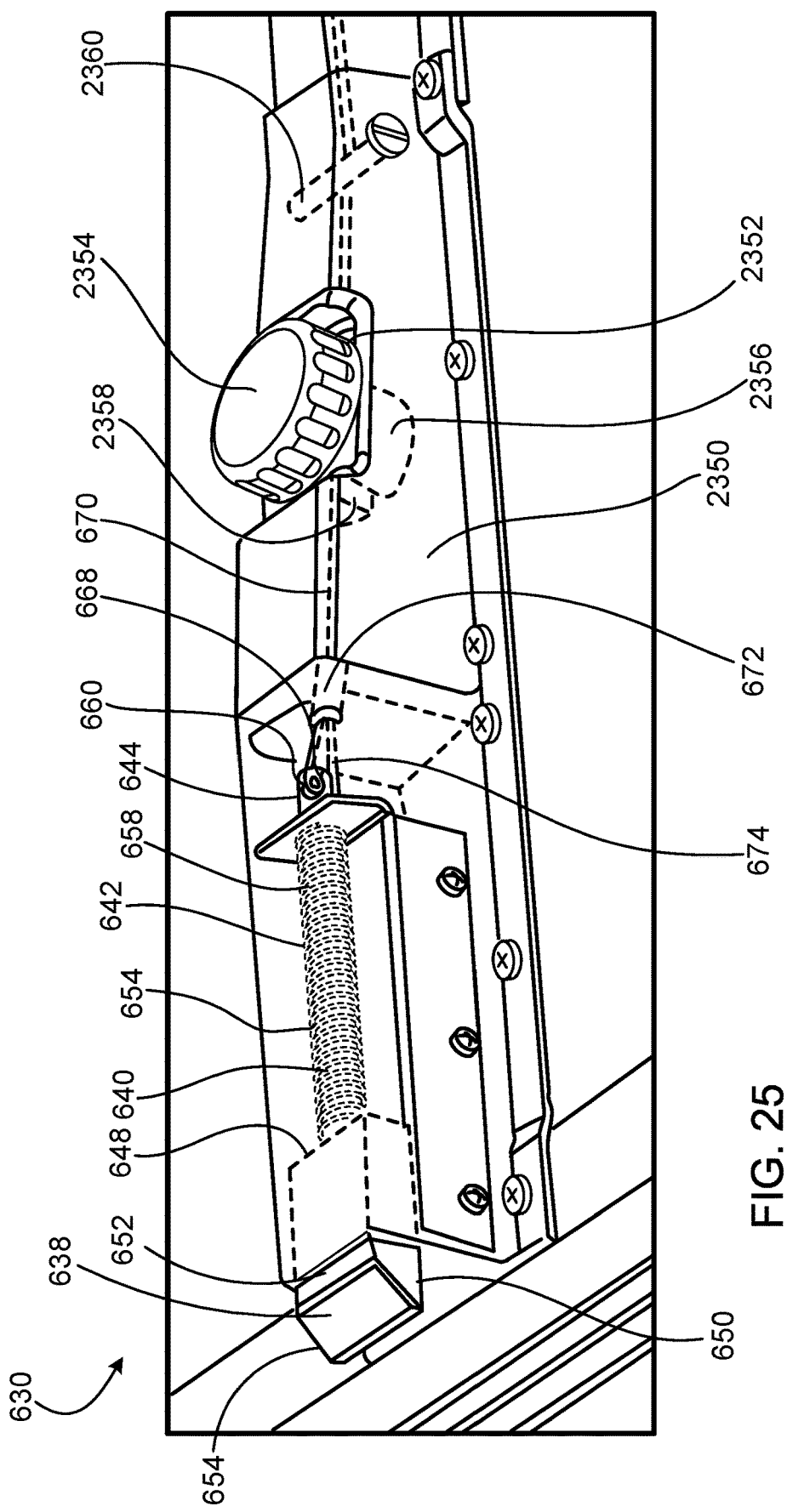
FIG. 25 is partial perspective view of a plunger assembly on the forward panel showing components in phantom.

An exploded view in phantom of the driver side plunger assembly is shown in FIG. 25. The plunger mechanism 636 of the driver side plunger assembly 630 is shown in detail in an extended position under the edge 70 of the truck bed side wall. When extended, the plunger contacts the edge 70 of truck bed side rail to prevent rotation of the tail gate panel into an open or stacked position. When retracted the plunger no longer engages the edge of the truck bed, allowing the panel to be opened. The primary locking mechanism is connected to the plungers.

The plunger mechanism includes a first slam-latch end 638 a middle section 640 with a spring 642 and a second attachment end 644. The first slam-latch end can be a nylon, polyolefin, ABS or aluminum body comprising a sloped end 646 and a rear end 648. The sloped end is orientated to retract when the panel is lowered to the closed or flush position. The slam-latch end has a top surface 650 and a bottom surface 652. The top surface is longer than the bottom surface and the distance between the top and bottom surfaces is +/−½ inch so that a +/−45 degree angled slope will retract +/−½ inch as the plunger dynamically strikes or engaged the truck bed between the top, side wall and edge as the panel is lowered into the closed position. The middle section can be separate or integral with the slam-latch end. The middle section comprises a rod 654 with a first end 656 connected to the slam-latch end, an extended middle portion 658 and a rod end 660. The ends may include a shoulder 662 or threaded elements 664. The spring is positioned along the length of the rod between the slam-latch end and the attachment end. The spring is wrapped around the rod to provide an extension bias allowing the plunger to retract as the panel is lowered to contact the truck bed. The spring is light duty and compressed with as little as 5-10 pounds of force. The spring is biased to push the slam-latch end into the expended position. The spring may be affixed to elements of the plunder.

The attachment end can be separate or integral with the middle section. The attachment end includes an aperture 668, clip or element to secure the end of an aircraft cable or wire braid 670. In a preferred arrangement a ferrule 672 is crimped to secure the looped cable end 674 extending from the central latch to the driver or passenger side latch mechanism. As described below, when the central latch is unlocked with a key 264 and rotated 90 degrees the cable retracts the plunger from the extended position under the edge of the truck bed to a closed or retracted position allowing the panel to be freely rotated to open the cover panel.

As seen in FIG. 23 the rear ward facing tail gate frame member 730 includes a forward facing C channel section 732 to receive rear panel 408, a rearward facing end section 734 including a t-slot 736 and a projecting tail gate end section 738 and an open middle section 740. An aperture 742 is created in the top surface 744 of the rearward facing frame member approximate a middle location between the driver and passenger side walls. The aperture is sized to receive a spring loaded lock cylinder 746 having a shoulder plate 748 with a diameter greater than the width of the aperture. Sealing gaskets 750 are compressed against the surfaces of the frame member by a compression nut 752 to secure the lock cylinder in place. At the bottom of the lock cylinder is cam 754 with two end attachments 756 provided to secure an end of the cable or wire braids. The cam is secured by a screw 758. When the key is positioned into the lock cylinder and rotated 90 degrees the cam swivels to retract the plunger allowing the cover panel to be opened.

Figure 24:
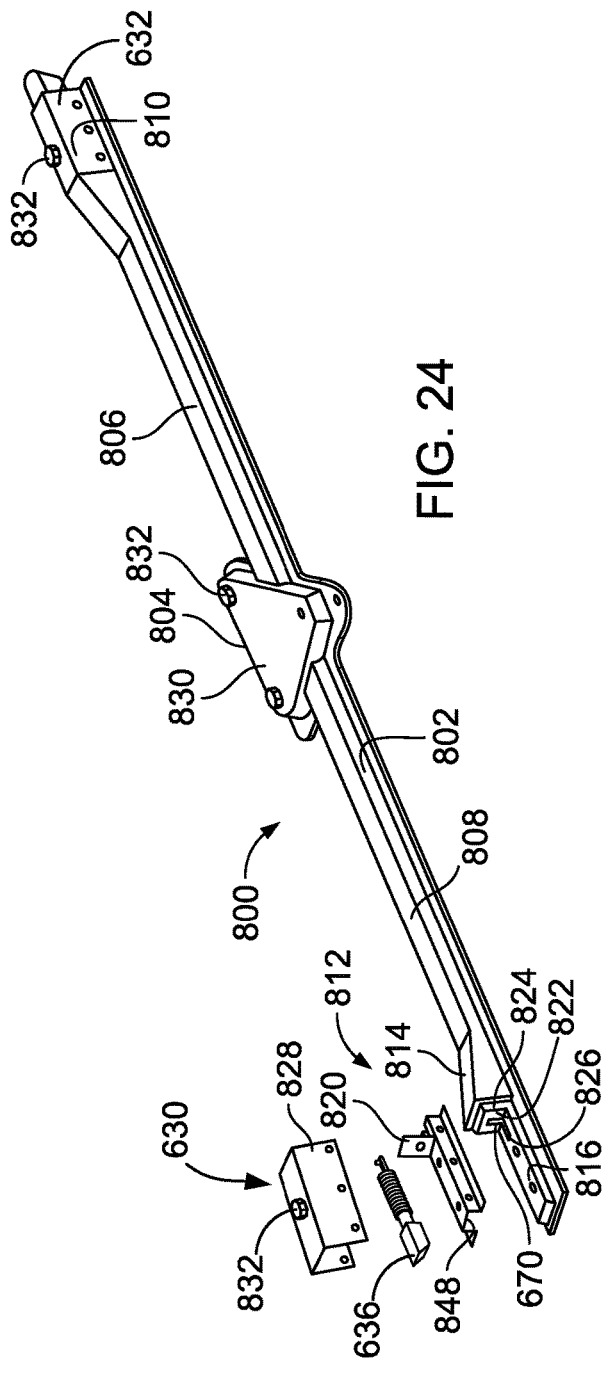
FIG. 24 is a perspective view of the latch housing positioned under the rear panel with an exploded view of the plunger assembly.

As seen in FIG. 24 the open middle section may be closed with a cover assembly 800. The cover may be a molded plastic housing 802 made from thermoplastic such a ABS or high impact styrene. The cover assembly has a central body 804, a driver side channel 806 and a passenger side channel 808 and a driver side latch body 810 and a passenger side latch body 812 shown in exploded view. The passenger side latch body includes sloped wall 814 and latch support surface 816. A metal plunger plate 818 is mounted over the latch support surface and includes an end wall 820 with a hole through which the attachment end is inserted. The end wall acts to retrain lateral movement of the spring when the cable is pulled to retract the slam-latch plunger from the extended position. The outward end wall 822 of the sloped wall includes a shoulder 824 and a slotted opening 826 through which the cable 670 extends in operable condition. When the cable is secured to the attachment end of the plunger a plunger cover plate 828 is positioned over the combined elements to complete the assembly of the passenger side latch. A plurality of removable screws fasten the assembly together.

It should be noted from time to time the cable may fray or disengage the cam of the central latch or the attachment end of the plunger. The plunger cover plate and a central cover plate 830 are removable so as to enable a truck owner or technician to repair and reconnect new cables. Additionally, the cover plates can be augmented with bumpers 832 to prevent denting the surfaces of the cover panels as they are rotated into stacked configurations.

Figure 26:
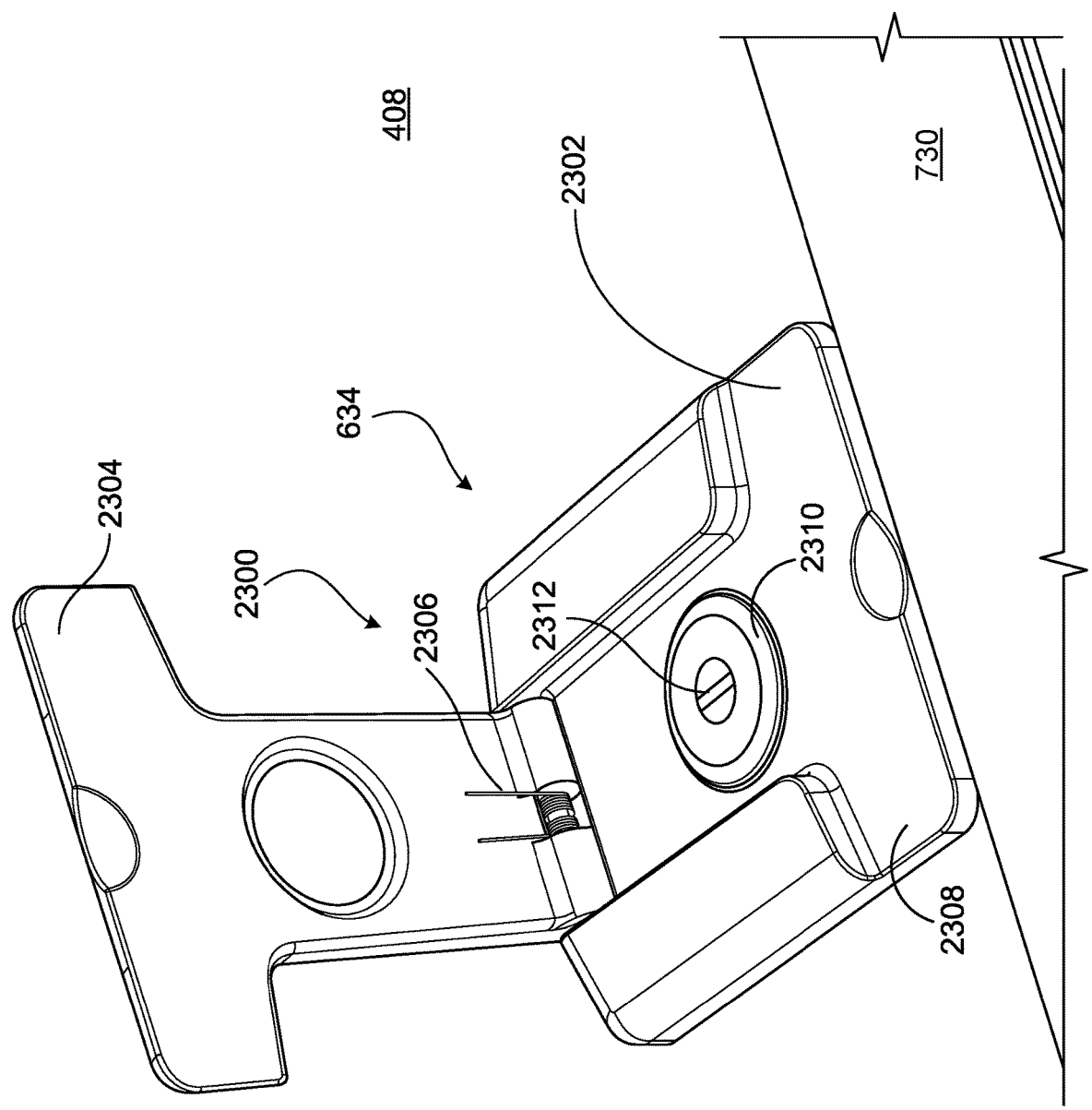
FIG. 26 is a perspective view of the locking latch and cover mounted on the top of the rear panel.

In an alternate arrangement, the lock mechanism 634 can be positioned on the rear panel 408 instead of the rearward face tailgate frame member 730. As seen in FIG. 26 a lock assembly 2300 is mounted over the panel. The assembly includes a base 2302 and a t-handle shaped cover 2304. The t-handle shaped cover is biased with a spring 2306 to close the cover over the base. The t-handle can be used to lift the panel open. The base includes a recess 2308 to receive the flange 2310 of a marine or automotive grade lock cylinder 2312.

Figure 27:
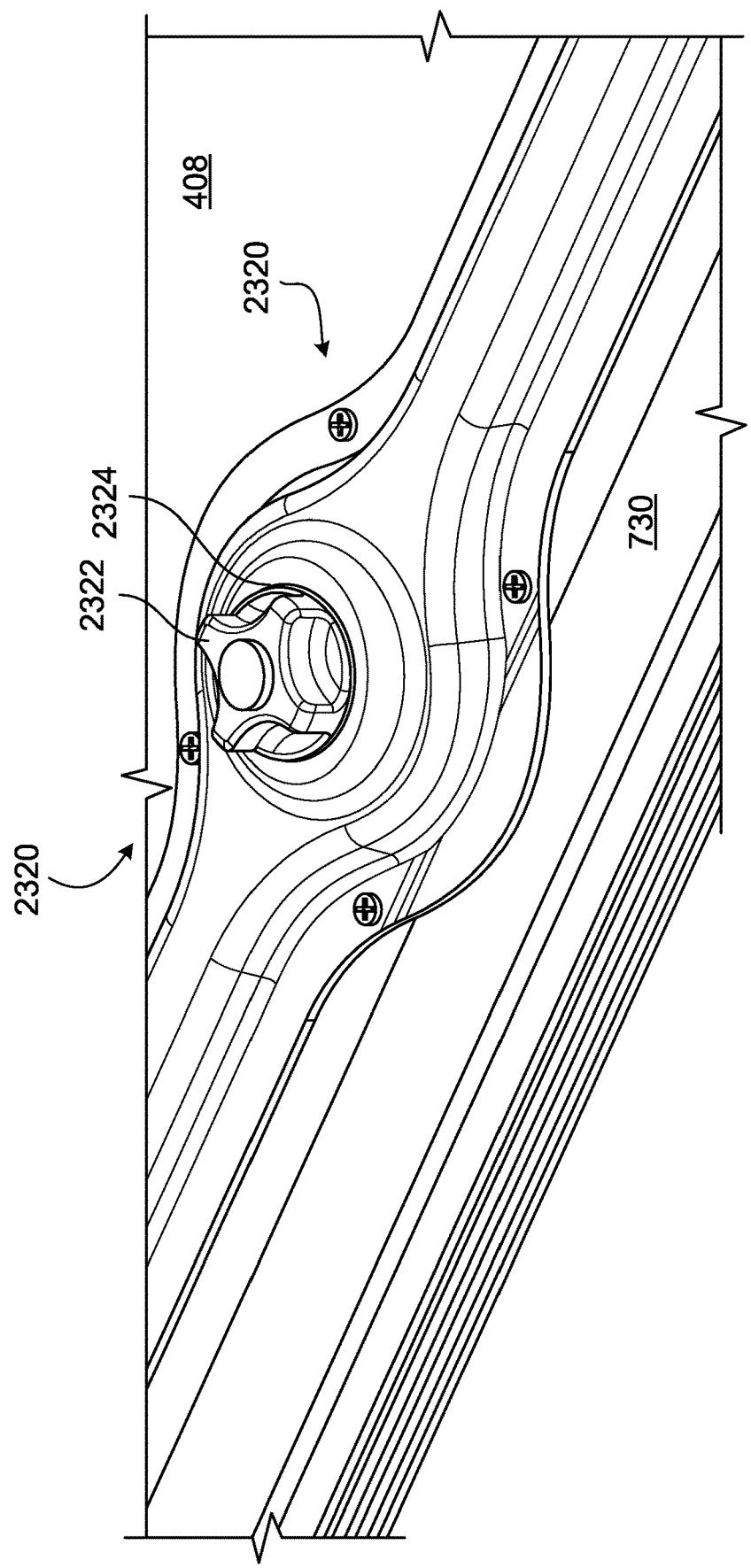
FIG. 27 is a partial perspective view of the molded housing containing the lock assembly positioned on the underside of the rear panel.
Figure 28:
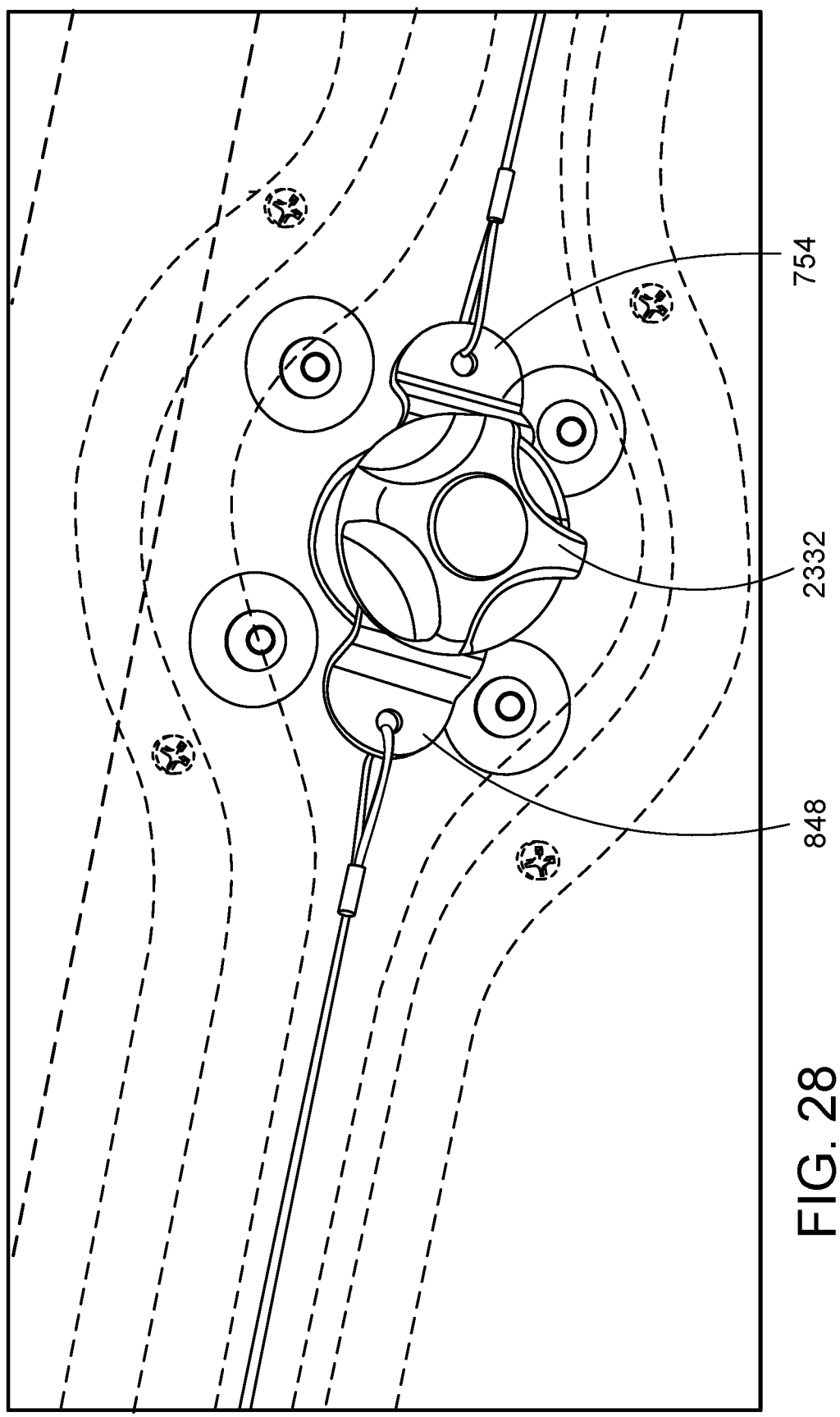
FIG. 28 is a view taken at FIG. 27 in phantom showing the cam and cables positioned inside the molded housing.
Figure 29:
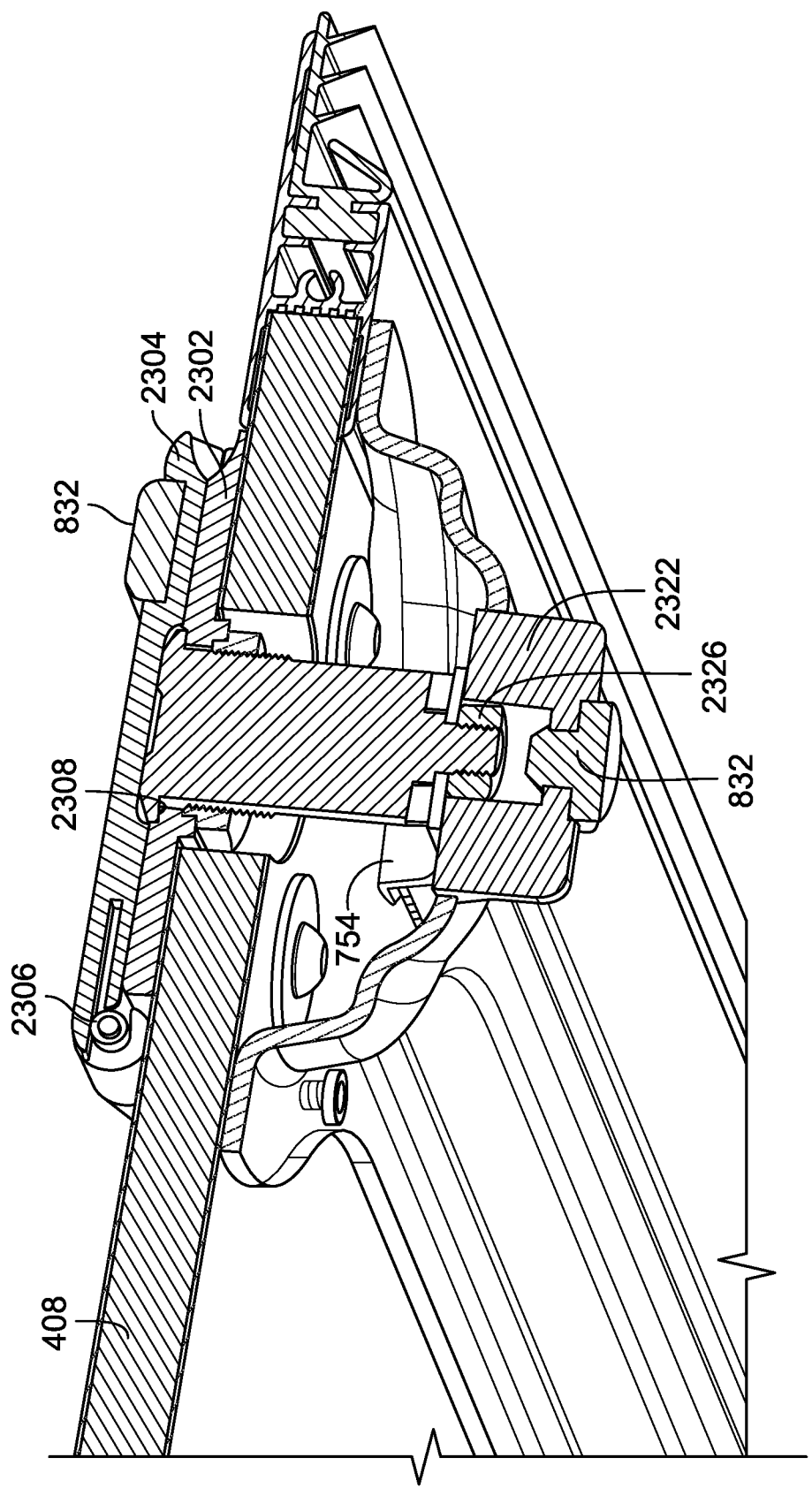
FIG. 29 is a center liner cross section shown in perspective of the lock assembly and molded housing.

As presented in FIG. 27 a lock and latch cover assembly 2320 is positioned below the lock cover assembly on the underside of panel 408 to contain and protect the locking and latching mechanisms. The latch cover assembly can be made of plastic or composite material in one or more parts, and extends between the driver and passenger plunger assemblies. As further seen, a twist knob 2322 projects through an opening 2324 in the latch cover assembly. As seen in FIG. 29 the twist knob is connected to the lock cylinder by a nut 2326 below the lock cylinder. As seen in phantom, in FIG. 28, a cam 754 is connected to the lock cylinder and the twist knob, so that when the lock cylinder is engaged in an unlocked position by means of a key 264, the twist knob can be rotated from below the cover, when the tailgate is lowered, to move the cam 90 degrees, to thereby pull the cables to retract the plunders on the driver and passenger sides of cover panel. This arrangement allows the tail gate panel to be lifted by means of actuating the locking mechanisms from either the top or the bottom of the cover. When the lock cylinder is engaged in the locked position by means of the key, the twist knob cannot be rotated about the lock cylinder, providing an increased measure of security.

Figure 30:
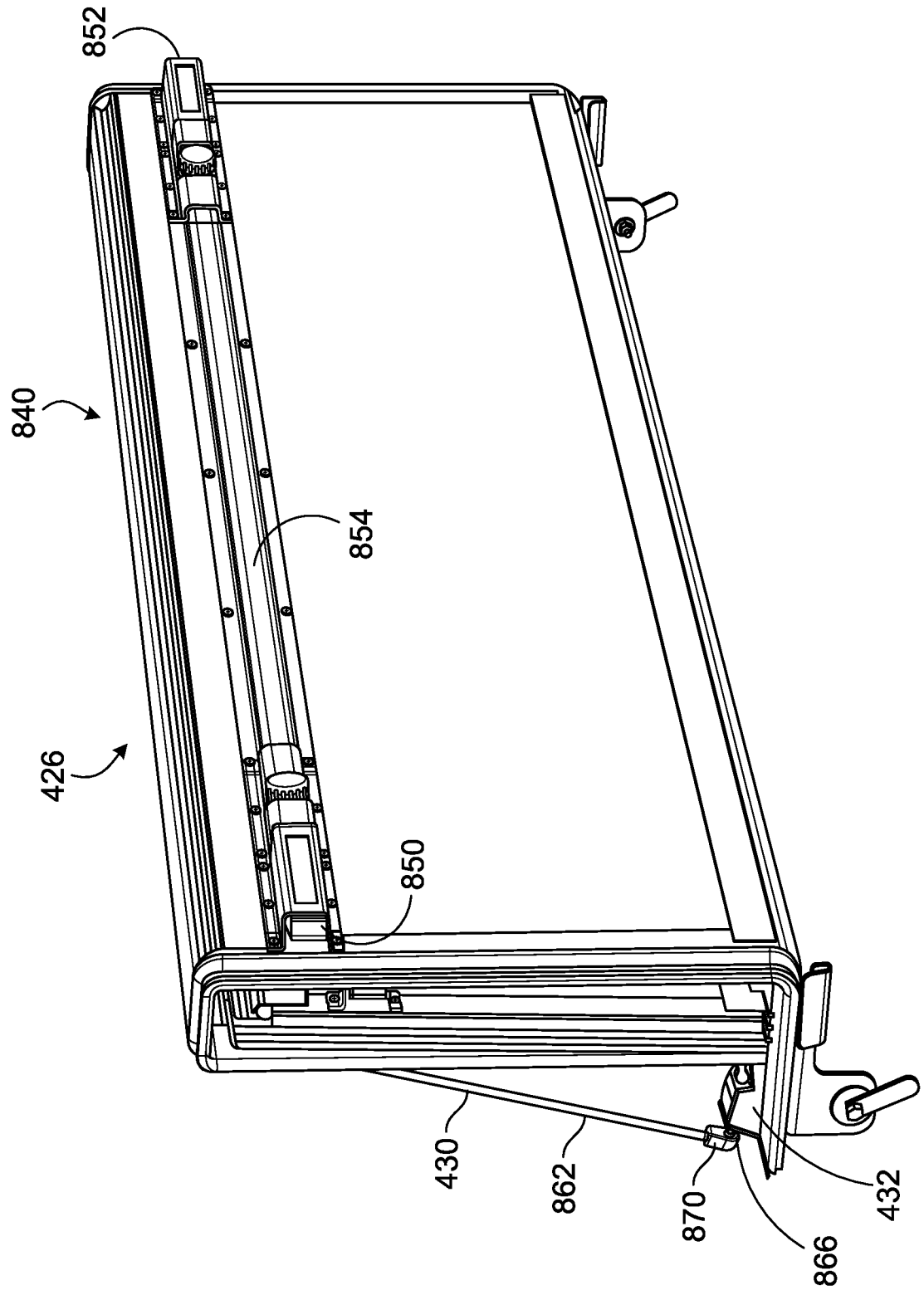
FIG. 30 is a perspective view of the cover assembly supported in the vertical position by the prop support mechanisms.

As seen in FIG. 30 it is not feasible to position a single twist knob in the middle of the front panel 404, beyond arms length, in order to lift the stack into the vertical position shown in FIG. 6. Instead the driver and passenger side plunder assemblies are augmented with twist handles as seen in FIG. 25. The end cap 2350 includes an indent 2352 positioned to receive a driver side twist knob 2354. Each driver and passenger twist knob includes a lower portion 2356 with a cable channel 2358. When one twist knob is rotated the channel pulls the cable to retract both plungers from the extended position to the retracted position, so the front panel can be lifted into the vertical position. A guide pin 2360 in the end cap helps guide the cable.

FIG. 30 also shows a cover assembly 840 with prop support mechanisms 430 which are provided to retain the cover panels in an upright position of FIG. 6. The prop support mechanism is positioned on the underside of the middle panel and included at least one prop rod 862 with a first end 864 fixed to a ball stud 866 and a second end 868 with a releasable anchor 870 affixed to a second end 872. When the cover panels are rotated into the upright position the second end of the prop rod is manually released and moved to engage the ball stud 866 of the support bracket 432 mounted to the top exterior surface of the bulk head panel. With reference to FIG. 6 and FIG. 30 showing the panels retained in a vertical position 426 by a prop support mechanism 430 affixed to a support bracket 432 mounted on the front bulkhead panel 402, the following description is provided showing means to accomplish the arrangement.

Figure 31:
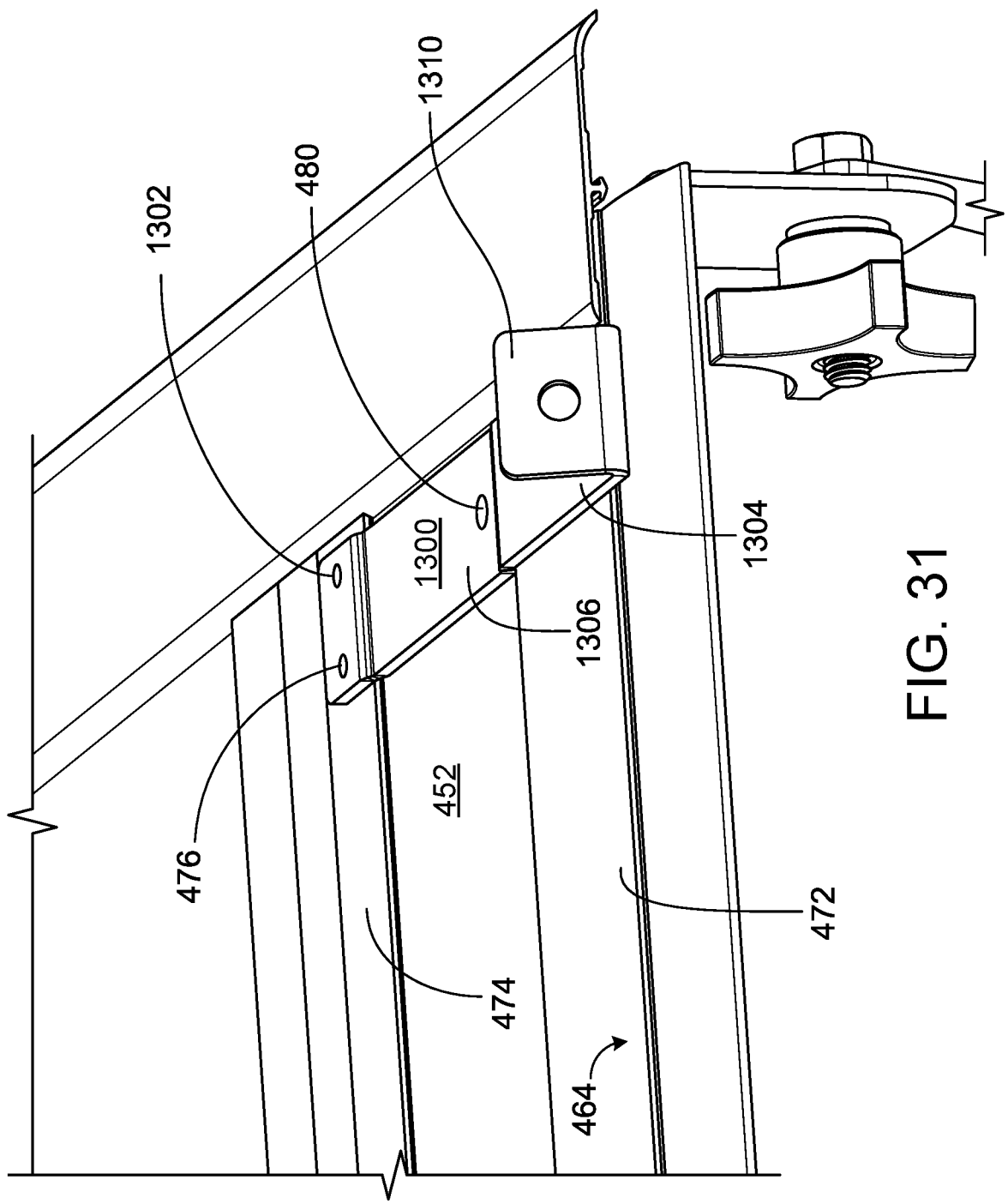
FIG. 31 is partial perspective view of the mounting plate of the prop support mechanism.

FIG. 31 shows a metal mounting plate 1300 comprising a first end 1302 and a middle section 1306 between a second end 1304. The middle section extends the width between the rearward aluminum frame 474 and the forward aluminum frame 472 of the bulkhead panel. The second end in the forward position includes an upward projecting ball stud wall 1310 to receive ball stud 866. The ball stud 866 with the mounting plate engages a releasable anchor 870 on the prop rod 430 of the second panel assembly 406. When engaged the panels are retained in part in a vertical position, even when the vehicle is in motion transferring forces upon the open tonneau cover by the mounting plate.

The forces acting upon the mounting plate at the ball stud during use are distributed across the length of the mounting plate in the middle section and first end. The first end of the mounting plate extends over the rear extrusion 472 and includes two holes 476 trough which fasteners pass to engage a wall thickness 478 of the rear extrusion. The middle section 1306 includes an opening 480 to receive a fastener 1126 that passes through an adjacent hole in bulkhead panel. The bulkhead panel includes a top surface layer 452, a core material 450 and a bottom layer 454. Two small fasteners and one large fastener are used the support the free end of the second end positioned above and beyond the forward frame 472 of the panel assembly 464.

The metal mounting plate in FIG. 31 is shown with two bends to compensate for the wall thickness of the forward and rearward extrusion frames of the panel assembly. However, the bends can be omitted and a gasket comprising a compressible material and an adhesive could be substituted with associated benefits to compensate for the difference in elevation of the components of the panel assembly.

Figure 32:
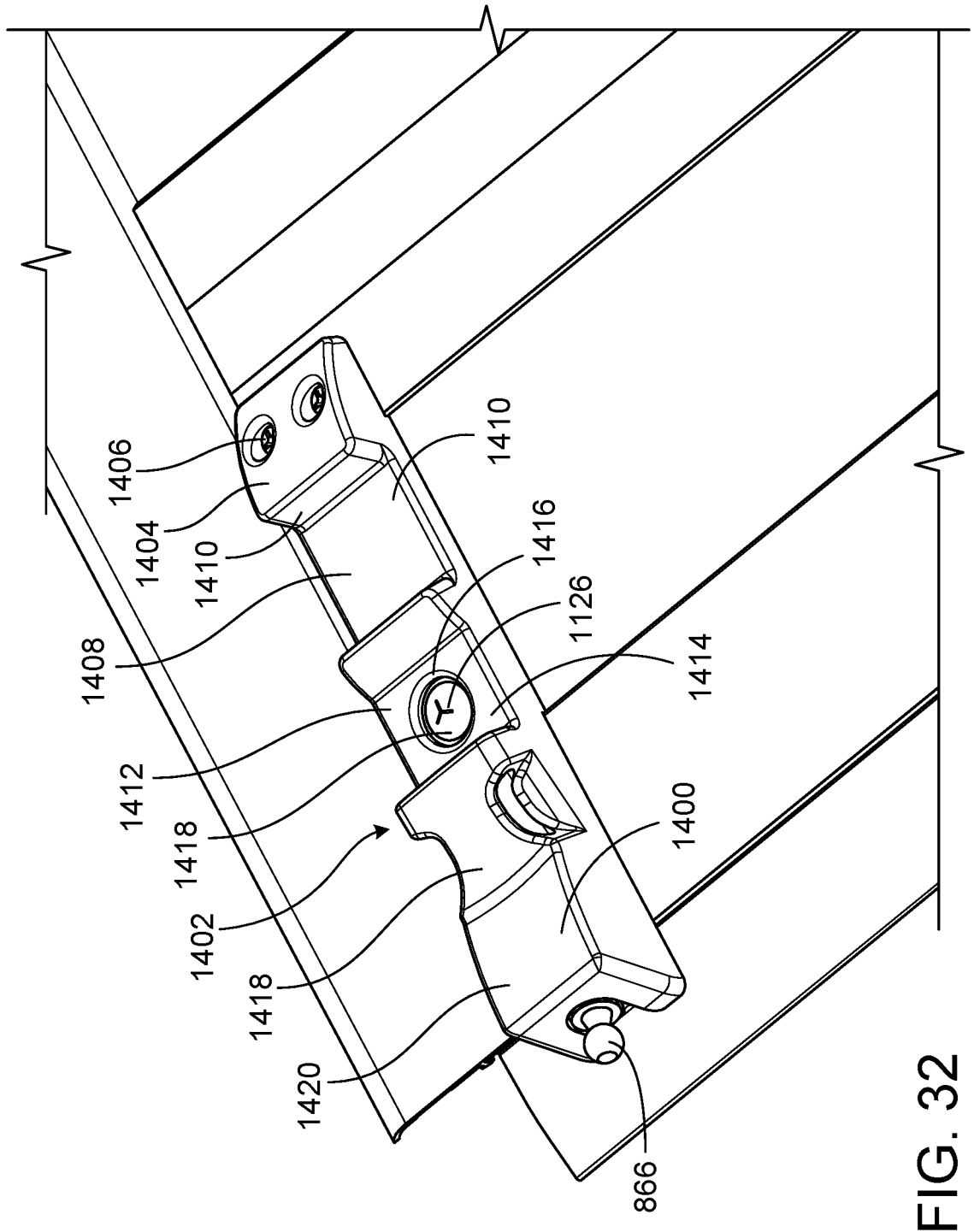
FIG. 32 is partial perspective view of the plastic molding covering the mounting plate with the attached ball stud.

The metal mounting plate is coupled with a plastic body 1400 to the panel assembly. As seen in FIG. 32 the plastic body overlaps the mounting plate to form a front cover clip 1402. The plastic body has five noticeable features. The first feature 1404 is a raised section having a pocket 1404 to receive a first fastener 1406. The second feature 1408 defines a tapered channel 1410 for cradling the stacked panels in the vertical position. The third feature 1412 is a surface 1414 with a recess 1416 to receive a carriage bolt 1418 or the like. The fourth feature is a female buckle 1418 for receiving a strap with a male buckle to secure the panels in the position shown in FIG. 5. The fifth feature is a raised housing 1420 for the exposed ball stud 866 projecting from the metal mounting plate 1300.

Figure 33:
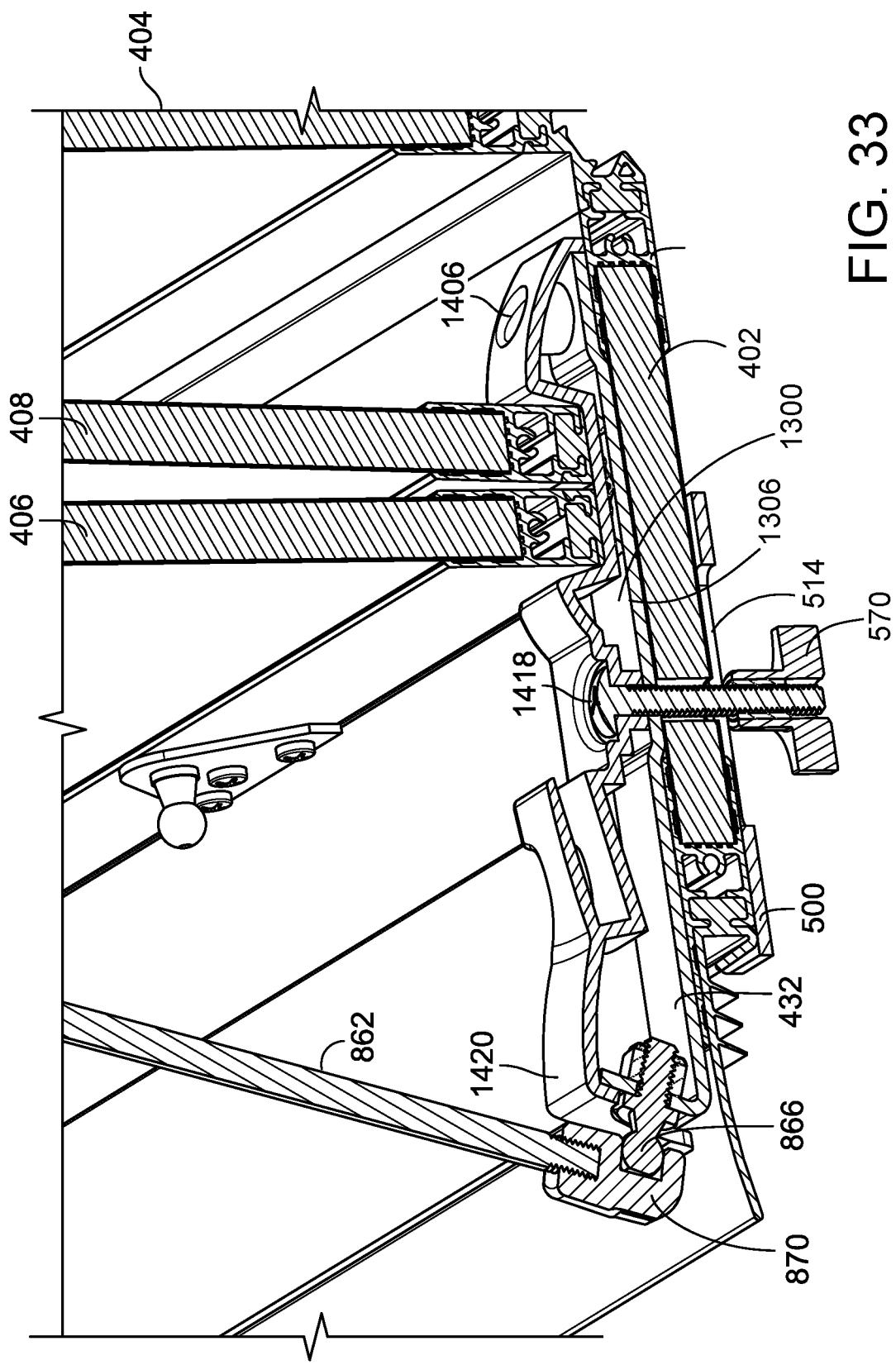
FIG. 33 is cross section in partial perspective view of the cover assembly in the vertical position taken along the center line of the mounting plate.

The center line of the structure of the present assembly is presented in FIG. 33. As can be seen, the middle section 1306 receives a carriage bolt 1418 that passes through the plastic body, the mounting plate, the top surface skin, the core, the bottom surface skin and the side wall mounting plate 500 having a slotted opening 514. The carriage bolt projects a distance below the side wall mounting plate to receive a threaded thumb knob 570 or the like. In this manner the cover assembly is secured to the truck bed.

As seen at FIG. 36 the releasable anchor 870 of the prop rod 862 is manually affixed to the ball stud to support the cover assembly in the upright position 426 seen in FIG. 6. It is to be appreciated the preferred forward location of the ball studs retained in position by means of the mounting brackets establishes a 60 to 80 degree angle, and more particularly a 68-72 degree angle 2040 sufficient to absorb the driving forces under which the cover is expected to experience, for example by sudden breaking or acceleration.

Figure 34:
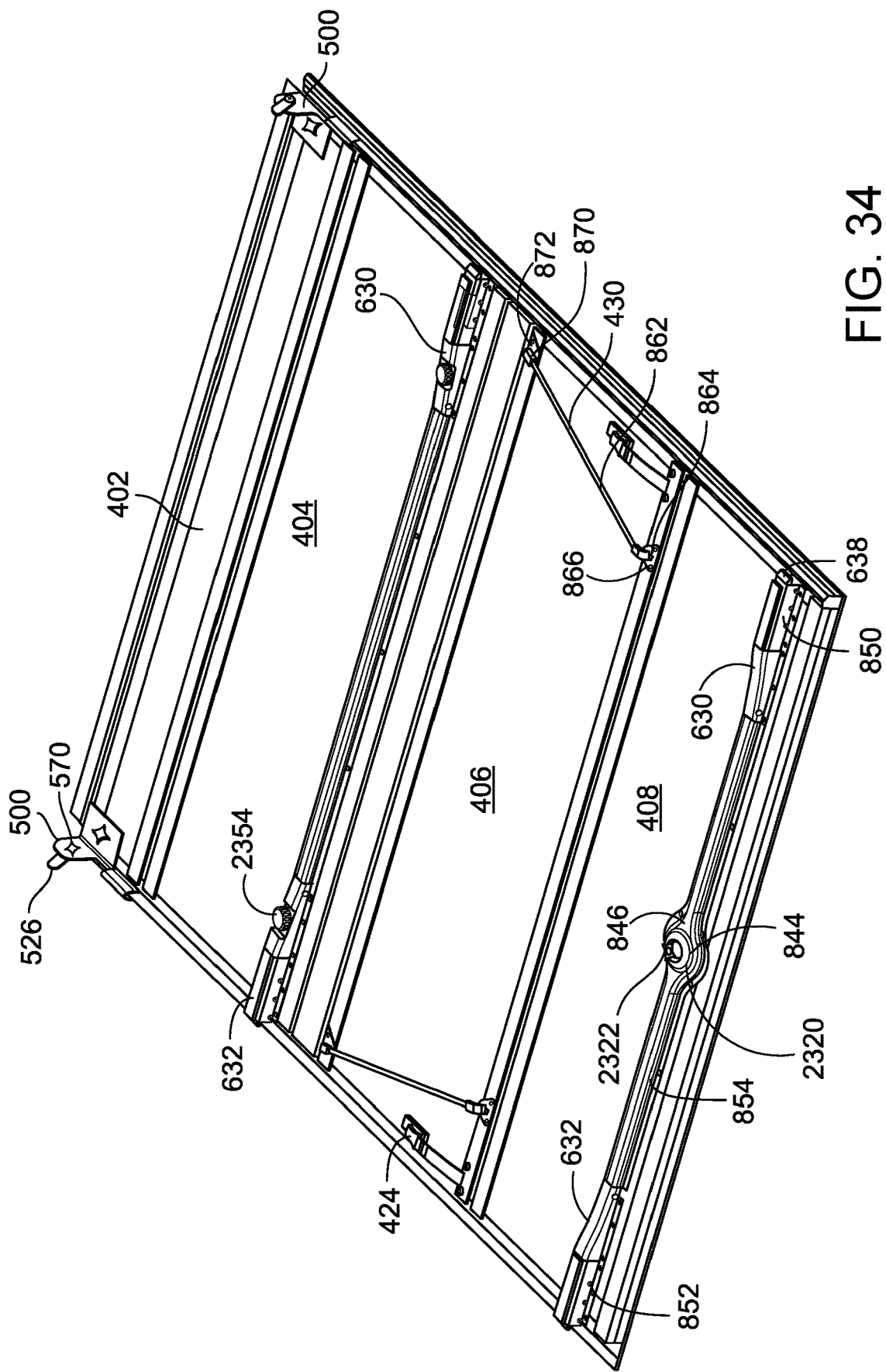
FIG. 34 is a perspective view of the underside of the cover assembly.
Figure 35:
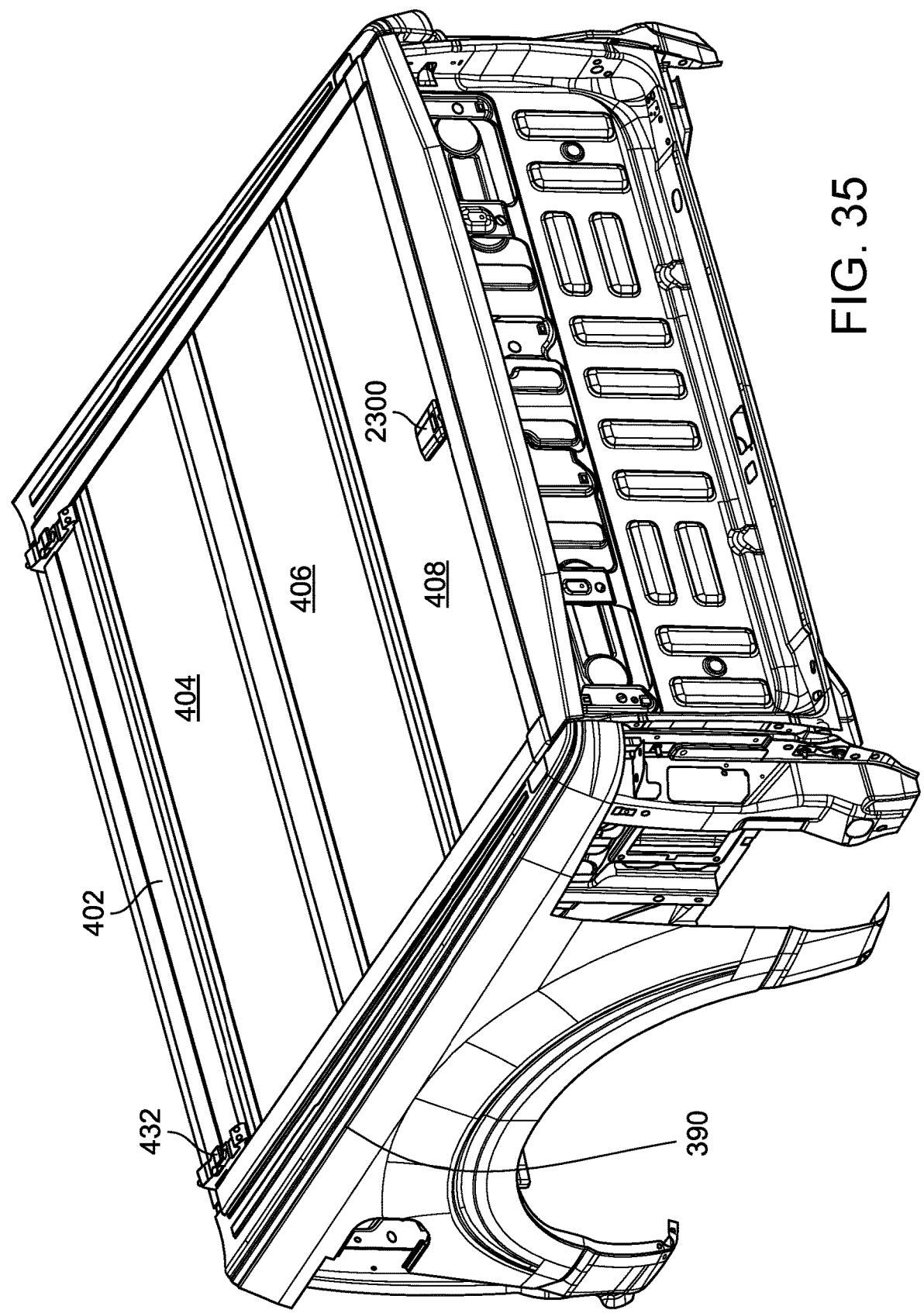
FIG. 35 is a perspective view of the top side of the cover assembly positioned over a truck bed.

Having set forth a general description of the parts and means for carrying out the invention, a preferred embodiment is presented in FIGS. 34 and 35. FIG. 34 shows the assembly from below or the underside with the passenger side being on the right. The side wall mounting plates 500 are shown mounted to the bulk head panel 402 by means of the fastening element 526 and the thumb knob 570. It is to be understood the mounting plate could be fastened to the side wall or the bulk head wall. The plunger assemblies 630 and 632 with twist knobs are shown mounted to the forward panel 404. The prop support mechanisms 430 and strap and buckle mechanisms 424 are mounted to the middle panel 406 in a stored or flat position. The housing 2320 for the central lock extending between the plunger assemblies 630 and 632 including a twist knob 2322 to actuate the plunger latches 638 to lift the last cover panel 408 is shown.

FIG. 35 shows the cover assembly on the top of the truck bed. The flat cover is locked and unlocked at the rear or tailgate panel 408 at a rear lock 2300. The four panels and hinge mechanisms are substantially flush with the top of the truck bed. The bulk head panel is fixed to the truck bed and includes driver and passenger side plastic bodies 1400 for retaining the assembly in the open positions defined by FIGS. 5 and 6.

FIG. 30 shows the cover assembly folded open with the three stacked panels supported upon the bulk head panel in a vertical position by means of the prop rods and plastic clip assembly.

A pickup truck 2
An open truck bed 4
Forward bulk head 6
Rearward tail gate 8
Opposed side walls 10*a* and 10*b*
Floor 12
Opposed wheel wells 14*a* and 14*b*
Rear pillar 16
Front pillar 18
Lights 20
Tie-down hooks 22
Misc. Apertures 24
Top ledge 30
Inside downturn lip 32
Inside edge 34
Outer truck bed wall 40
Inner truck bed wall 42
Reinforced structure 44
Double walled down-turn lip 48
Plastic bed rail cap 46
Press fit embossment 52
Aligned holes 50
Upper surface 60
Outside wall 62
Inside wall 64
Edge 70
Open space 80
Undercut 82
Stake hole pocket 90
45 to 90 degree bend 92
Interior wall 96
Marker 98
Opening 100
Pre-engineered holes 108
One piece bulk head panel 110
Unitary extruded member 114
Right lateral edge 116*b*
Left lateral edge 116*a*
Continuous top section 118
Top surface 120
Bottom surface 122
Intermediate ribs 210
Forward portion 124
Forward end 126
Top ledge 128
Leading edge 130
Recess 132
Sealing member 134
Forward box structure 140
T-slot 146
Rearward support walls 144
Weather strip 148
First column 150
Second column 152
Boss 154
Bottom wall 156
Rearward portion 160
Middle box structure 182
Projections 196
Bridge element 200
Channel structure 202
Opposed side rails 250*a* 250*b*
Screws 252
T-slot channel 258
Key 264
Top wall 300
Top surface 302
Bottom surface 304
Outer edge 306
Inner edge 308
Vertical column 310
Bottom wall 312
Panel channel 314
Upper surface 316
Depressions 318
Adhesive sealant 320
Inside wall 330
Outside wall 332
Top boss 334
T-slot 336
Fastener 338
Bottom surface 340
Avenue 342
Forward clamping plate 350
Rivets 352
Fastening slot 354
Extra weather strips 356
Auxiliary mounting rail 360
Top surface 362
Inside structure 364
Clamping surface 366
Support ledge 368
Two part clamps 370
Inside clamp element 372
Outside clamp element 374
Pass through bolt 376
First weather strip 380
Second weather strip 382
Double sided adhesive tape 384
Leaf 388
Ribs 390
Flexible fins 394
Folding cover assembly 400

Front bulk head panel 402
Forward panel 404
Middle panel 406
Rear panel 408
First hinge mechanism 410
Second hinge mechanism 412
Third hinge mechanism 414
Passenger cabin 416
Semi-open configuration 418
Stack 420
Latch mechanism 422
Strap and buckle mechanism 424
Vertical position 426
Forward panel latch mechanism 428
Prop support mechanism 430
Support bracket 432
Inside margin 440
Core material 450
Top surface layer 452
Bottom surface layer 454
Driver side lateral edge 456
Passenger side lateral edge 458
Forward edge 460
Rearward edge 462
Rough panel assembly 464
Four part frame 466
Driver side frame element 468
Passenger side frame element 470
Forward rail frame element 472
Rearward rail frame element 474
Nut 498
Side mounting plate 500
Vertical wall 502
Width 504
Length 506
Upper margin 508
Flat portion 510
Platform 512
Top opening 514
Side opening 516
Threaded opening 518
Flat bar 520
First end 522
Second end 524
Fastening element 526
Threaded stud 528
Shoulder 530
Rubber plug 532
Pass through hole 534
Anti-rotation feature 536
Threaded opening 538
Bolt 540
End plate 542
Thumb knob 570
Rubber o-ring 572
Markers 574
Rail frame element 600
Top section 602
Bottom section 604
Central section 606
C channel 608
T slot 610
Boss 612
Support walls 614
Inside surfaces 616
Indentations 618
Driver side plunger assembly 630
Passenger side plunger assembly 632
Central locking latch 634
Plunger mechanism 636
First slam latch end 638
Middle section 640
Spring 642
Attachment end 644
Sloped end 646
Rear end 648
Top surface 650
Bottom surface 652
Rod 654
First end 656
Extended middle portion 658
Rod end 660
Shoulder 662
Threaded element 664
Aperture 668
Wire braid 670
Ferrule 672
Looped cable end 674
Extra short bed truck 700
Apparatus 702
Four panels 704, 706, 708, 710
Eight side rail sections 712, 714, 716, 718
Gaps 720
Pliable rubber or EPDN gasket strip 724
Rearward facing frame member 730
Forward facing c channel section 732
Rearward facing end section 734
T slot 736
Projecting tail gate end section 738
Open middle section 740
Aperture 742
Top surface 744
Spring loaded lock cylinder 746
Shoulder plate 748
Sealing gaskets 750
Compression nut 752
Cam 754
End attachments 756
Screw 758
Cover assembly 800
Molded plastic housing 802
Central body 804,
Driver side channel 806
Passenger side channel 808
Driver side latch body 810
Passenger side latch body 812
Sloped wall 814
Latch support surface 816
Metal plunger plate 818
End wall 820
Outward end wall 822
Shoulder 824
Slotted opening 826
Plunger cover plate 828
Central cover plate 830
Alternate cover assembly 840
Hand actuated release mechanisms 842
Central housing 844
Removable lid 846
Central cam assembly 848
Driver side plunger 850
Passenger side plunger 852
Channel 854
Prop rod 862

First end 864
Ball stud 866
Second end 868
Releasable anchor 870
Flexible rubber extrusion 900
First hinge extrusion 902
Forward T slot projection 904
Rearward T slot projection 906
Top surface 908
Fulcrum 910
Narrow section 912
Bumper elements 914
Tabs 916
Second hinge extrusion 1000
Male ends 1006 and 1008
Wider top surface 1010
Forward hinging fulcrum 1002
Rearward hinging fulcrum 1004
Bridging section D-D
Top surface 1012
Bottom surface 1014
Open space 1018
Opposed indents 1020
Opposed channels 1022
Structural member 1030
Top wall 1032
Bottom wall 1034
Second hinge extrusion top wall 1036
Bottom wall 1038
Opposed channels 1040
Top wall 1100
Projecting section 1102
Bottom surface 1104
Recess 1106
Flexible weather strip 1108
Double sided adhesive tape 1110
Fingers 1112
Extended flap 1114
Outer edge 1116
Underside 1120
Fastening means 1122
T-slot channel 1124
Carriage bolt 1126
Nut 1128
Self tapping crews 1130
Flanged t-slot extrusion profile 1132
Metal mounting plate 1300
First end 1302
Second end 1304
Middle section 1306
Ball stud wall 1310
Plastic body 1400
Front cover clip 1402
First feature 1404
Pocket 1406
Second feature 1408
Tappered channel 1410
Third feature 1412
Surface 1414
Recess 1416
Carriage bolt 1418
Raised housing 1420
Main body 2000
First end section 2002
Second end section 2004
Rubber profile 2006
Opposed end walls 2010
Top surface of rubber hinge 2012
First and second open channels 2014
Side walls 2016
Dashed lines 2020
Tabs 2022
Angel 2040
Lock assembly 2300
Base 2302
T-handle shaped cover 2304
Spring 2306
Recess 2308
Flange 2310
Lock cylinder 2312
Lock and latch cover assembly 2320
Twist knob 2322
Opening 2324
Nut 2326
End cap 2350
Twist knob 2354
Lower portion 2356
Cable channel 2358
Guide pin 2360

The invention claimed is:

1. A double sided synthetic rubber hinge comprising:
a main body having a top wall, a bottom wall and opposed end walls separated by an internal open space, wherein the open space has a width between the end walls greater than a height between a bottom surface of the top wall and a top surface of the bottom wall, the main body defining a long narrow rubber strip and
a first lateral end and a second lateral end, the lateral ends extending from opposed end walls of the main body, such that the main body and lateral ends are extruded in one flexible rubber profile,
wherein a top surface of the top wall of the main body is continuous with a first top surface of the first lateral end and a second top surface of the second lateral end to form a uniform plane across a top face,
wherein the first and second lateral ends each further include opposed t-slot projections extending beyond the top face, whereby the opposed t-slot projections are configured for coupling with a first panel and a second panel,
wherein each of the lateral ends further include a positioned below the first and second top surface, each hinge formed by an open channel having side walls extending up from a bottom surface of each lateral end, to a hinging fulcrum positioned below the first and second top surfaces of the first and second lateral ends, the hinging fulcrum comprising a reduced wall thickness of synthetic rubber, and
a rigid member, the rigid member being positioned within the open space to restrict deflection of the top face of the flexible rubber profile between the opposed hinging fulcrums when the first panel and second panel are folded into a stack.

2. The double sided synthetic rubber hinge of claim 1 further comprising a margin of increased thickness adapted to engage sections of the first and second panels.

3. The double sided synthetic rubber hinge of claim 1 in which the rigid member is one of an aluminum extrusion with slots for receiving attachment screws, or a foam filled structure with metal assembly inserts for receiving attachment screws.

4. The double sided rubber hinge of claim 1 in which the side walls extending up to the hinging fulcrum include bump stop elements to reduce compressive forces upon the open channel formed in the lateral ends.

5. The double sided rubber synthetic hinge of claim 1 in which the top wall of the main body includes decorative panel skin contained in recessed pockets formed along its outside edges between the hinging fulcrums of the top face.

6. The double sided rubber synthetic hinge of claim 1 in which an overall thickness between the top face and the lower surface of the bottom wall of the main body and lateral edges is not greater than a thickness of the first or second panel to which the t-slot projections couple.

7. The double sided rubber synthetic hinge of claim 1 in which an overall width of the main body is equal to or greater than a thickness of two panels combined in cross-section.

8. The double sided synthetic rubber hinge of claim 1 in which the rubber mass at the fulcrum is less than a wall thickness between the top surface and bottom surface of the top wall.

\* \* \* \* \*